(12) United States Patent
Chien

(10) Patent No.: US 7,364,315 B2
(45) Date of Patent: Apr. 29, 2008

(54) TUBULAR ELECTRO-LUMINESCENT PANEL(S) LIGHT DEVICE

(76) Inventor: Tseng-Lu Chien, 8F, No. 29, Alley 73, Lin-Shen Road, Shi-Chi Town, Taipei Hseng (TW)

( * ) Notice: Subject to any disclaimer, the term of this patent is extended or adjusted under 35 U.S.C. 154(b) by 98 days.

(21) Appl. No.: 10/170,584

(22) Filed: Jun. 14, 2002

(65) Prior Publication Data

US 2003/0231485 A1  Dec. 18, 2003

(51) Int. Cl.
 *F21V 9/16* (2006.01)
(52) U.S. Cl. .................. 362/84; 362/104; 362/103
(58) Field of Classification Search ............. 362/84, 362/267, 310, 104; 40/544; 313/511, 512, 313/506, 509
See application file for complete search history.

(56) References Cited

U.S. PATENT DOCUMENTS 4,093,973 A * 6/1978 Vaagenes .................... 362/104
5,485,355 A * 1/1996 Voskoboinik et al. .......... 362/84
5,519,591 A * 5/1996 McCrary .................... 362/571
5,676,451 A * 10/1997 Tabanera .................... 362/156
5,711,594 A * 1/1998 Hay ............................ 362/84
6,302,554 B1 * 10/2001 Holce ......................... 362/84
6,461,015 B1 * 10/2002 Welch ........................ 362/103
6,945,663 B2 * 9/2005 Chien ......................... 362/84
6,976,762 B2 * 12/2005 Chien ......................... 362/84

* cited by examiner

*Primary Examiner*—Sandra O'Shea
*Assistant Examiner*—Anabel Ton
(74) *Attorney, Agent, or Firm*—Bacon & Thomas, PLLC

(57) ABSTRACT

A tubular Electro-Luminescent light device offers desired bending directions with super brightness based on the predetermined width of a panel incorporated with a proper inverter system. The panel has a much narrower width than a tube means containing the panel to allow the panel to bend in any direction and angle within the tube means to provide desired light effects. The panel can be flat or twisted within the tube means, which in turn may have a desired colored, transparency, wall thickness, diameter, shape, or length. The device may incorporate non-elastic means, magnetic means, a tube holder, sensor means, and/or integrated circuit to add a wide variety of features.

15 Claims, 14 Drawing Sheets

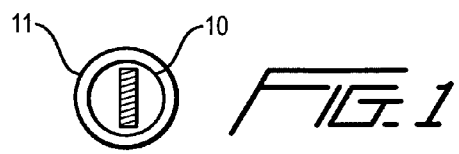
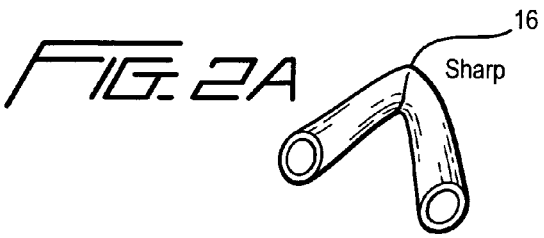
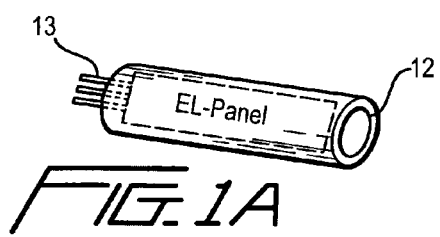
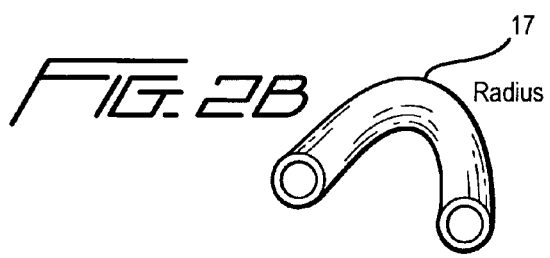
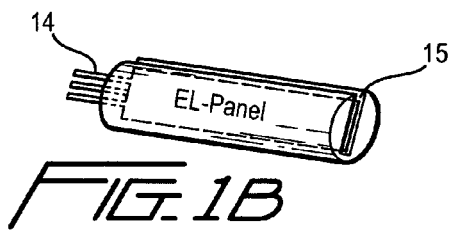
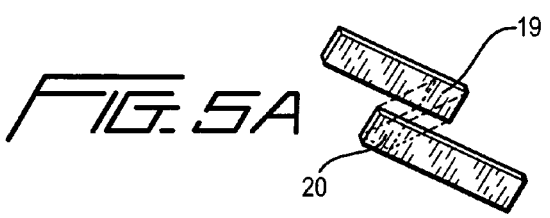
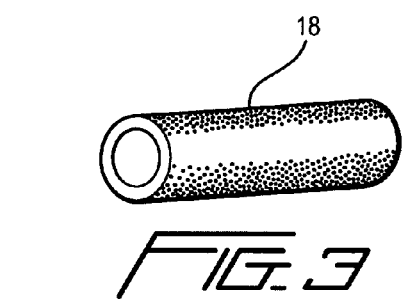
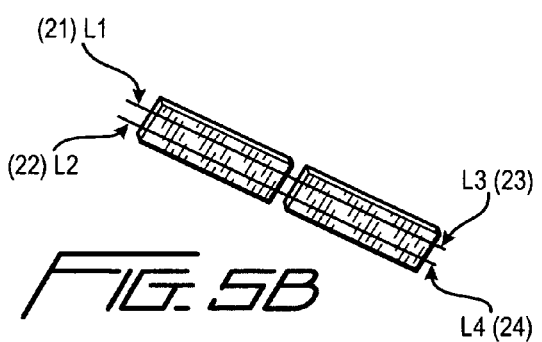
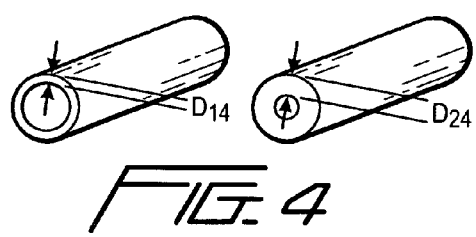
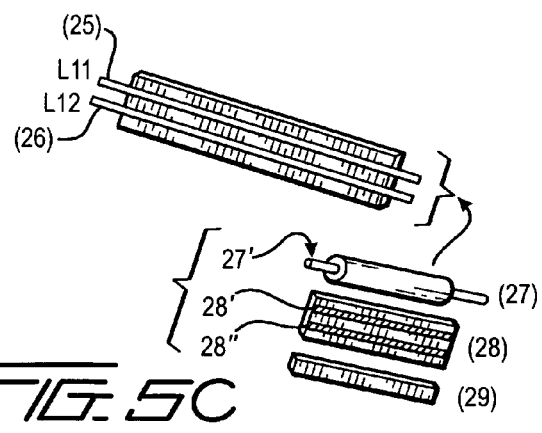

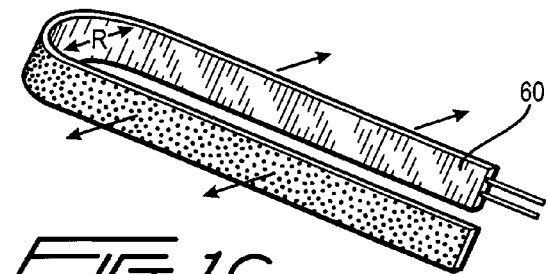
FIG. 1C
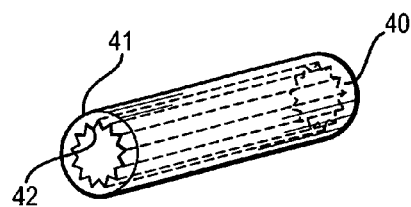
FIG. 7A
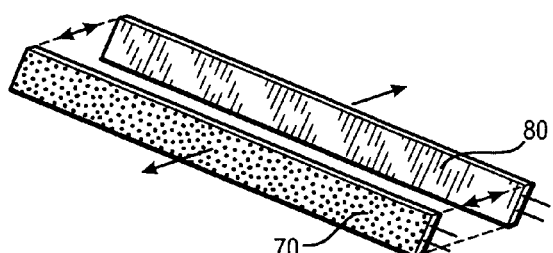
FIG. 1D
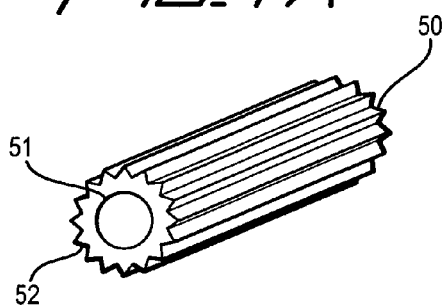
FIG. 7B
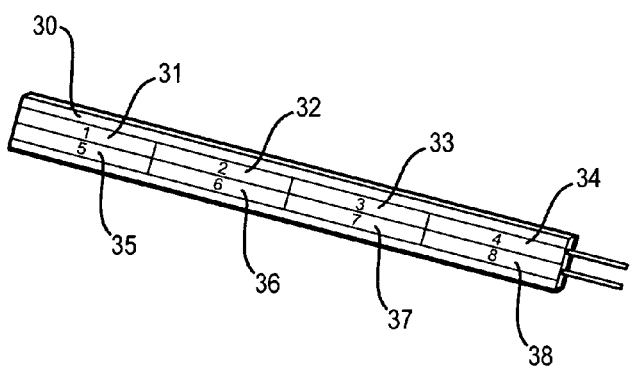
FIG. 6
FIG. 2D
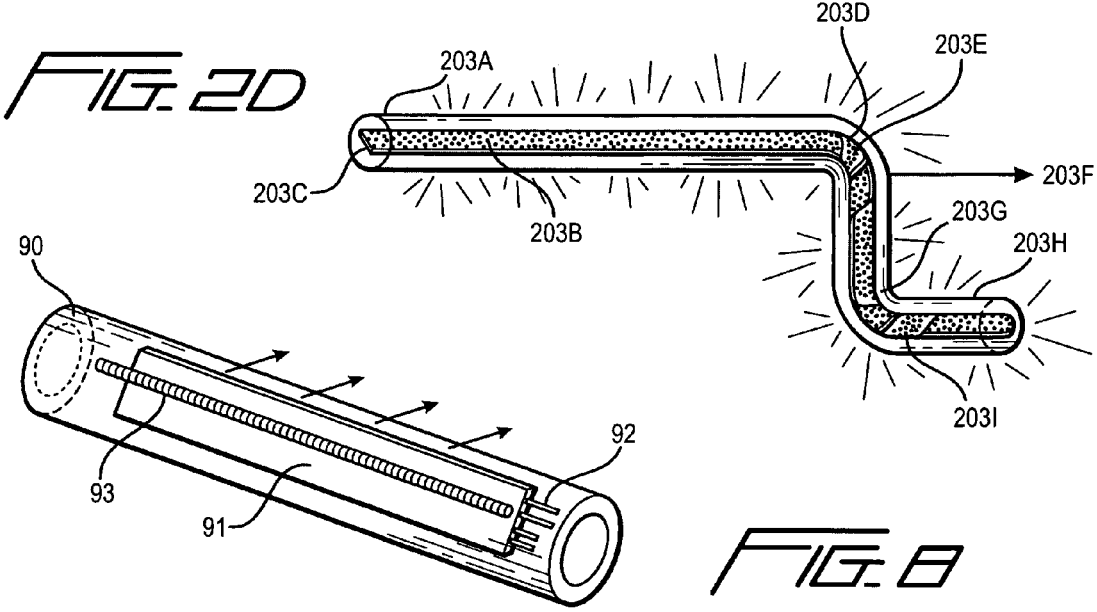
FIG. 8

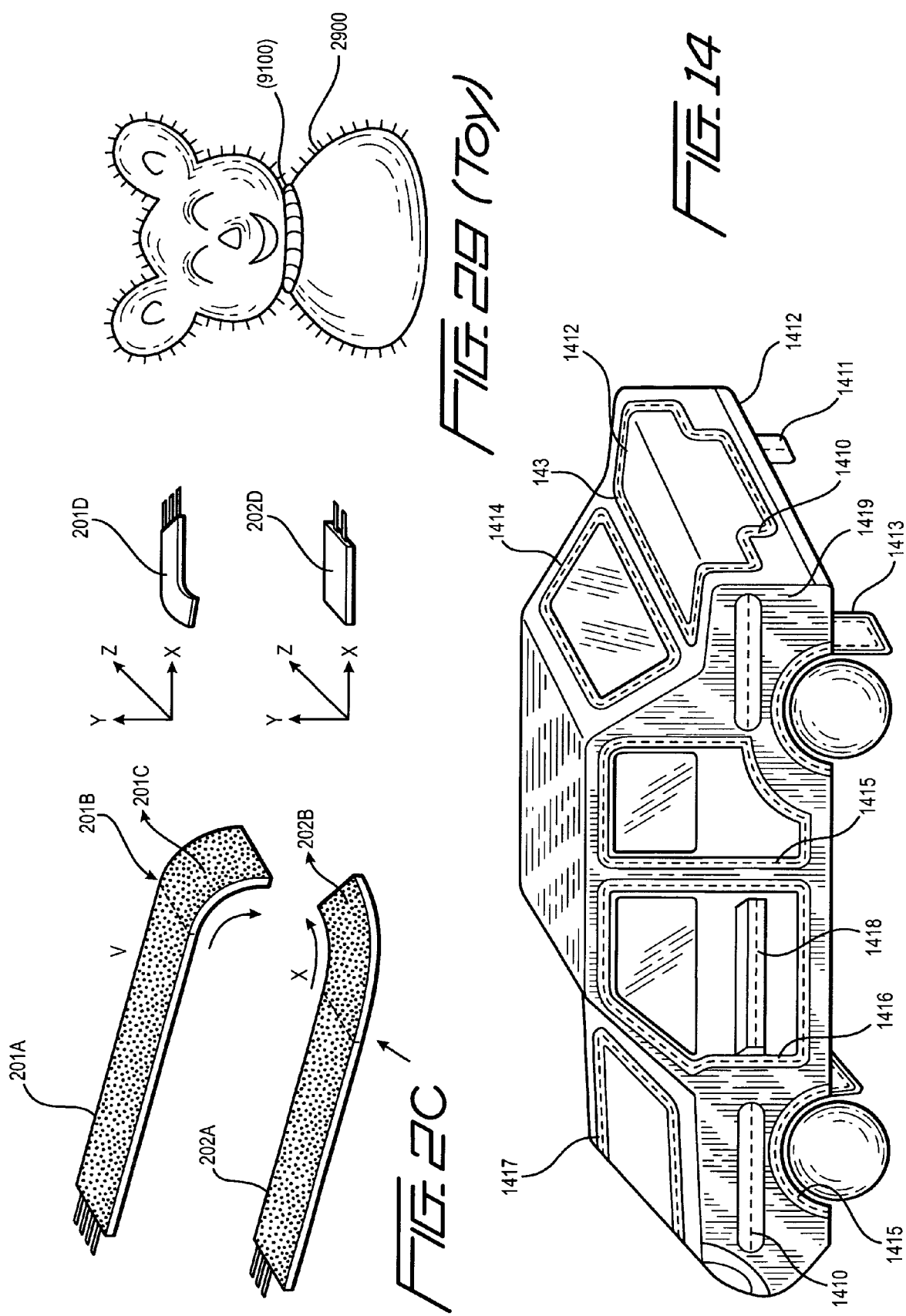

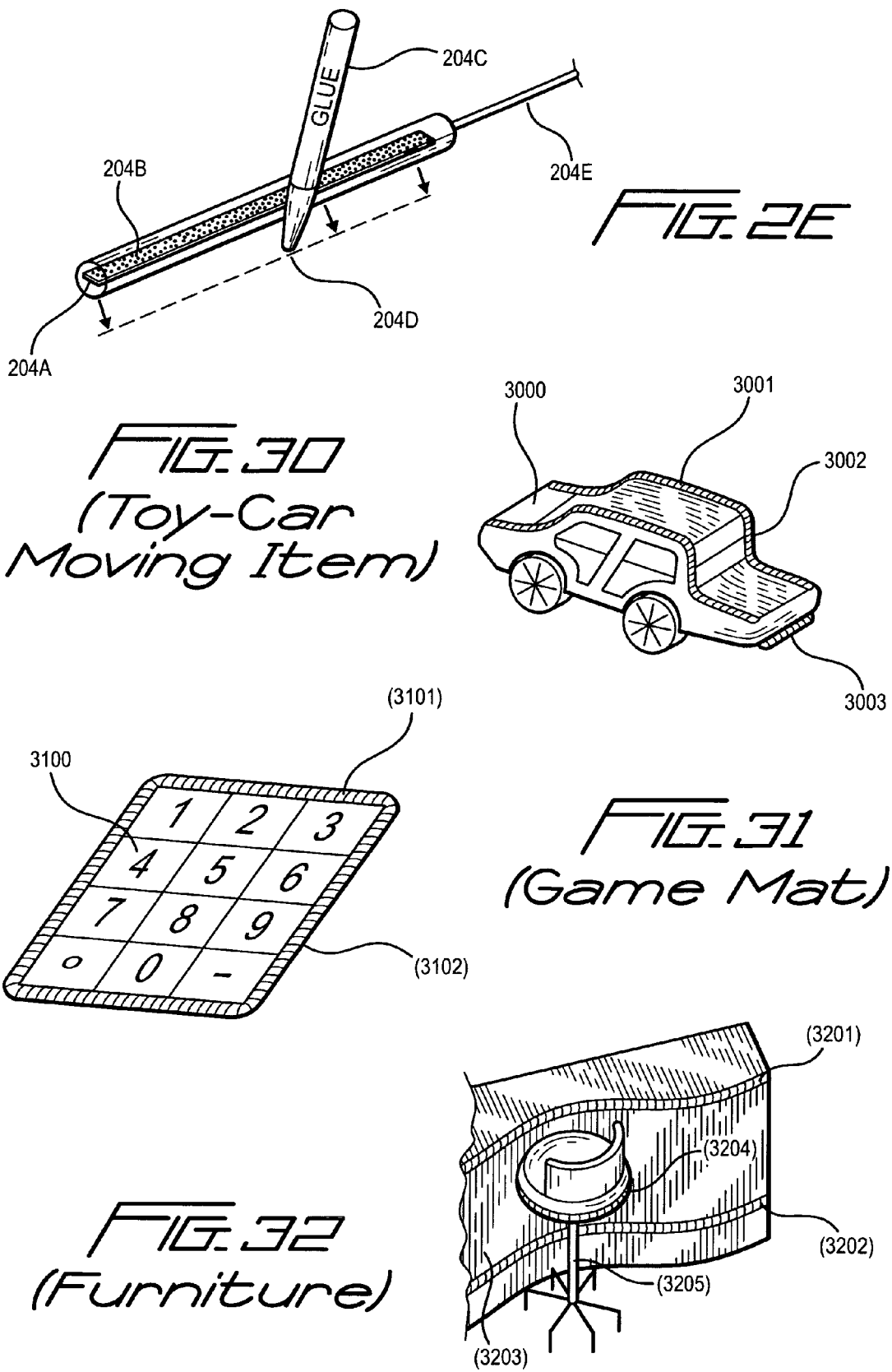

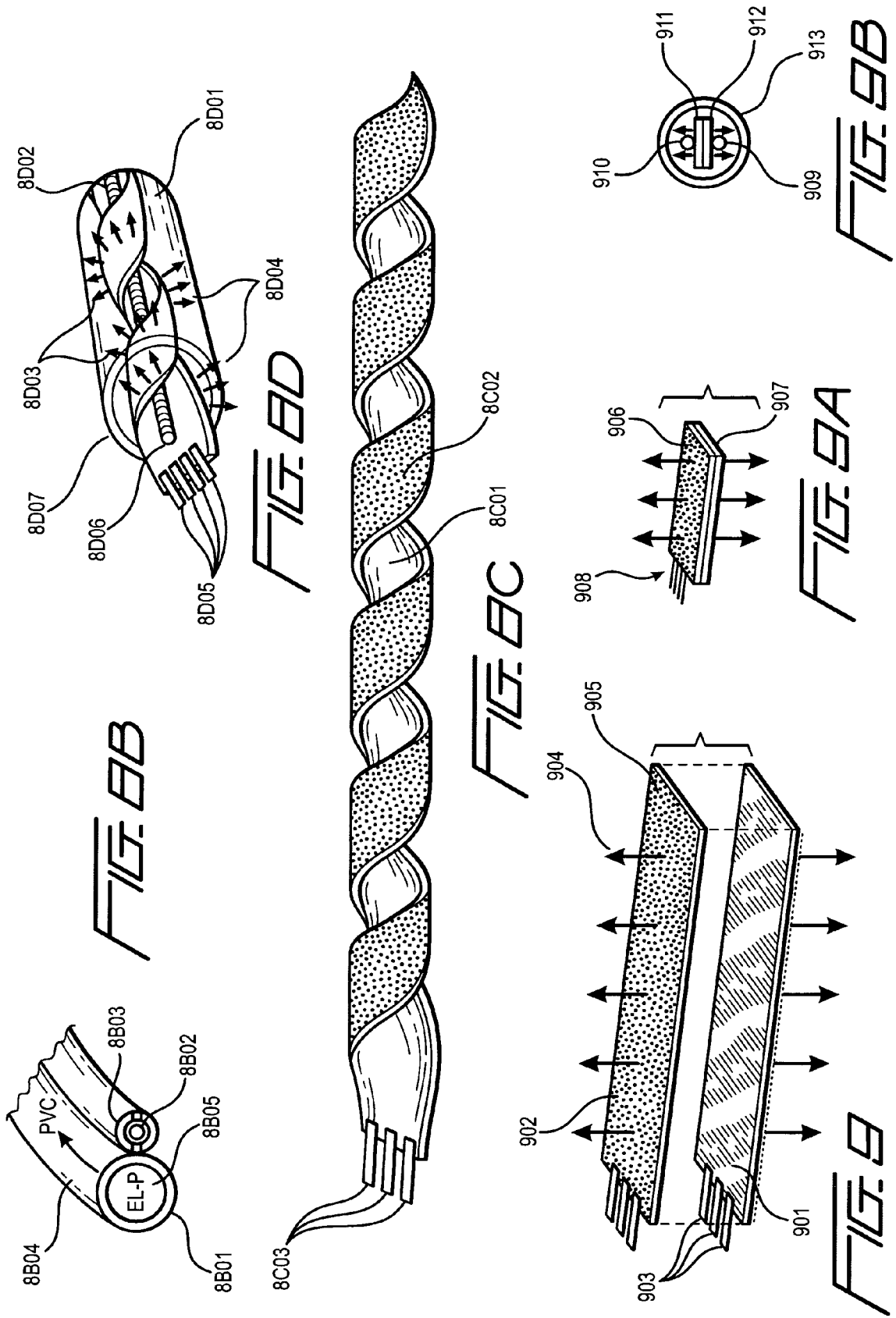

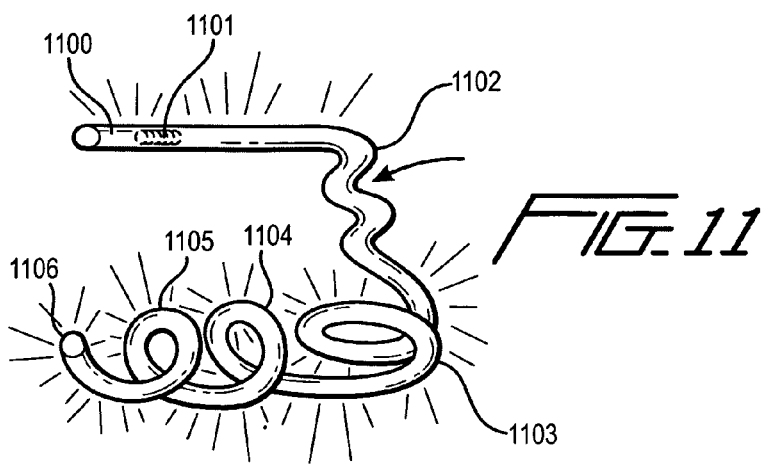
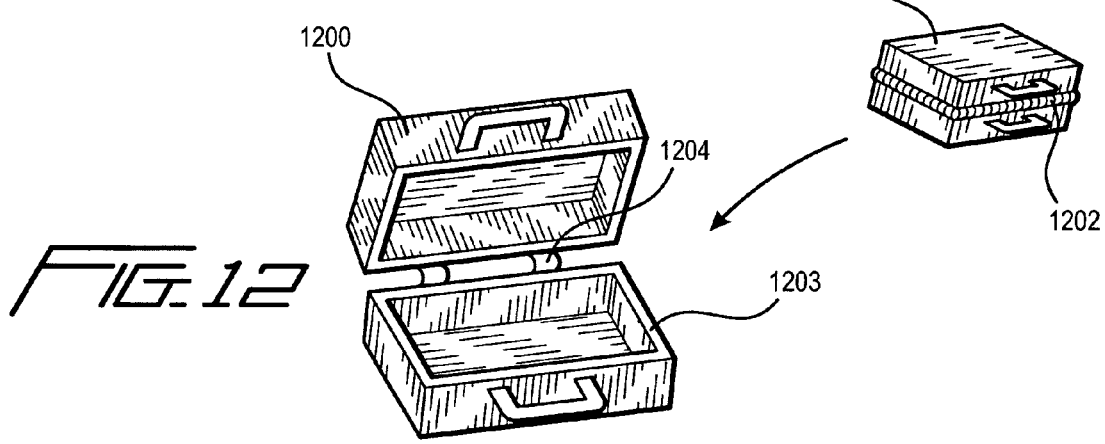
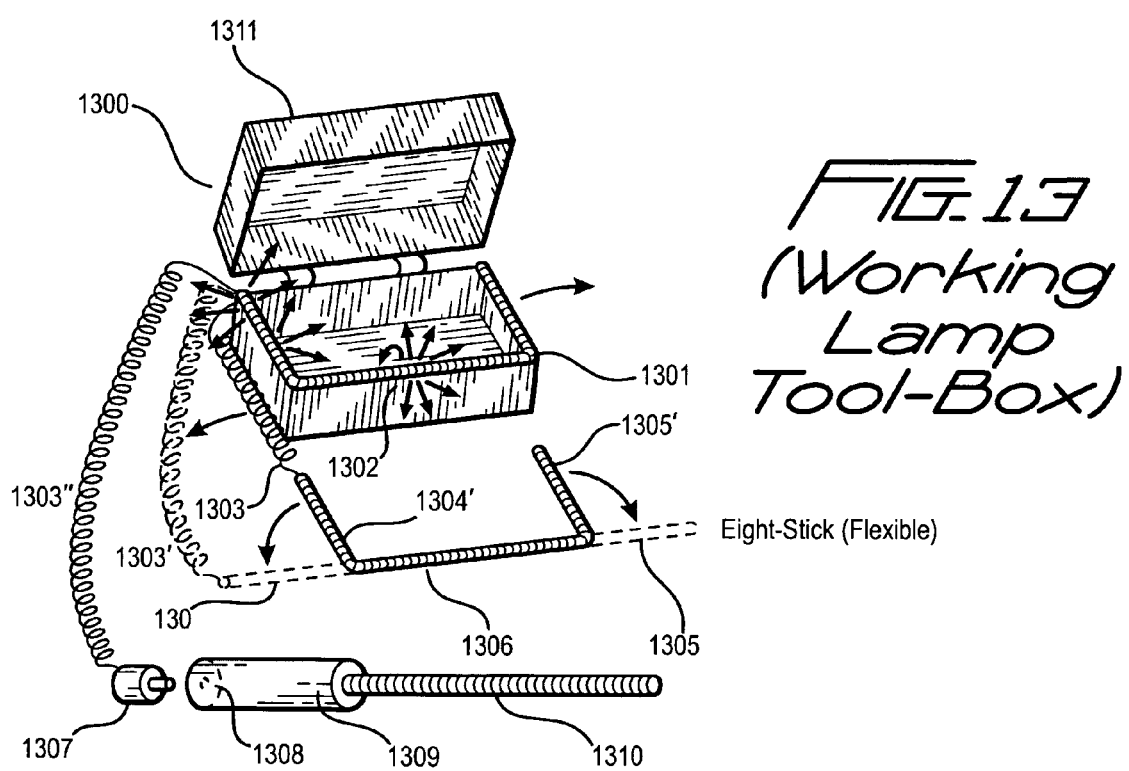
FIG. 13 (Working Lamp Tool-Box)
Eight-Stick (Flexible)

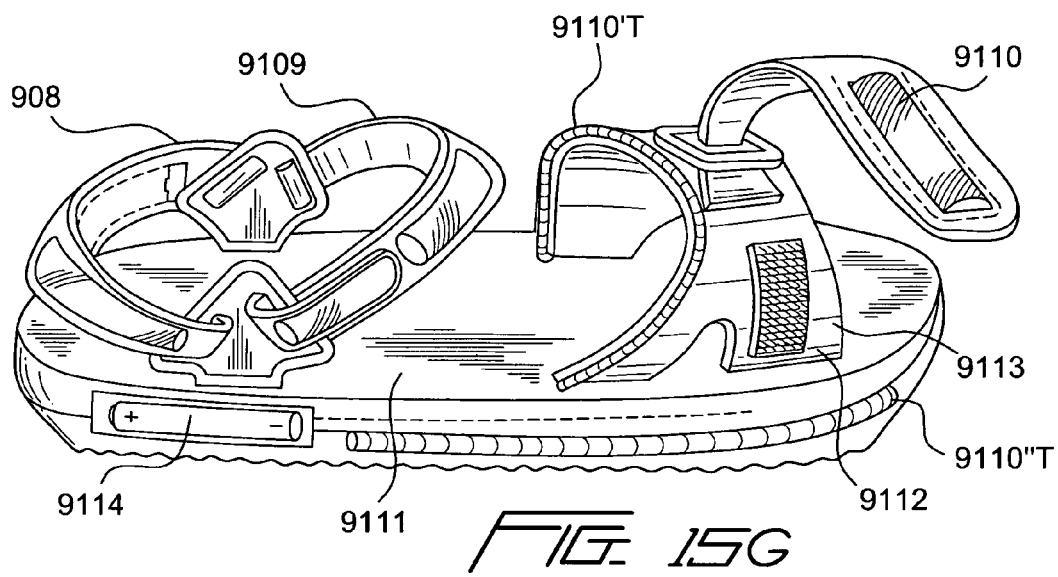

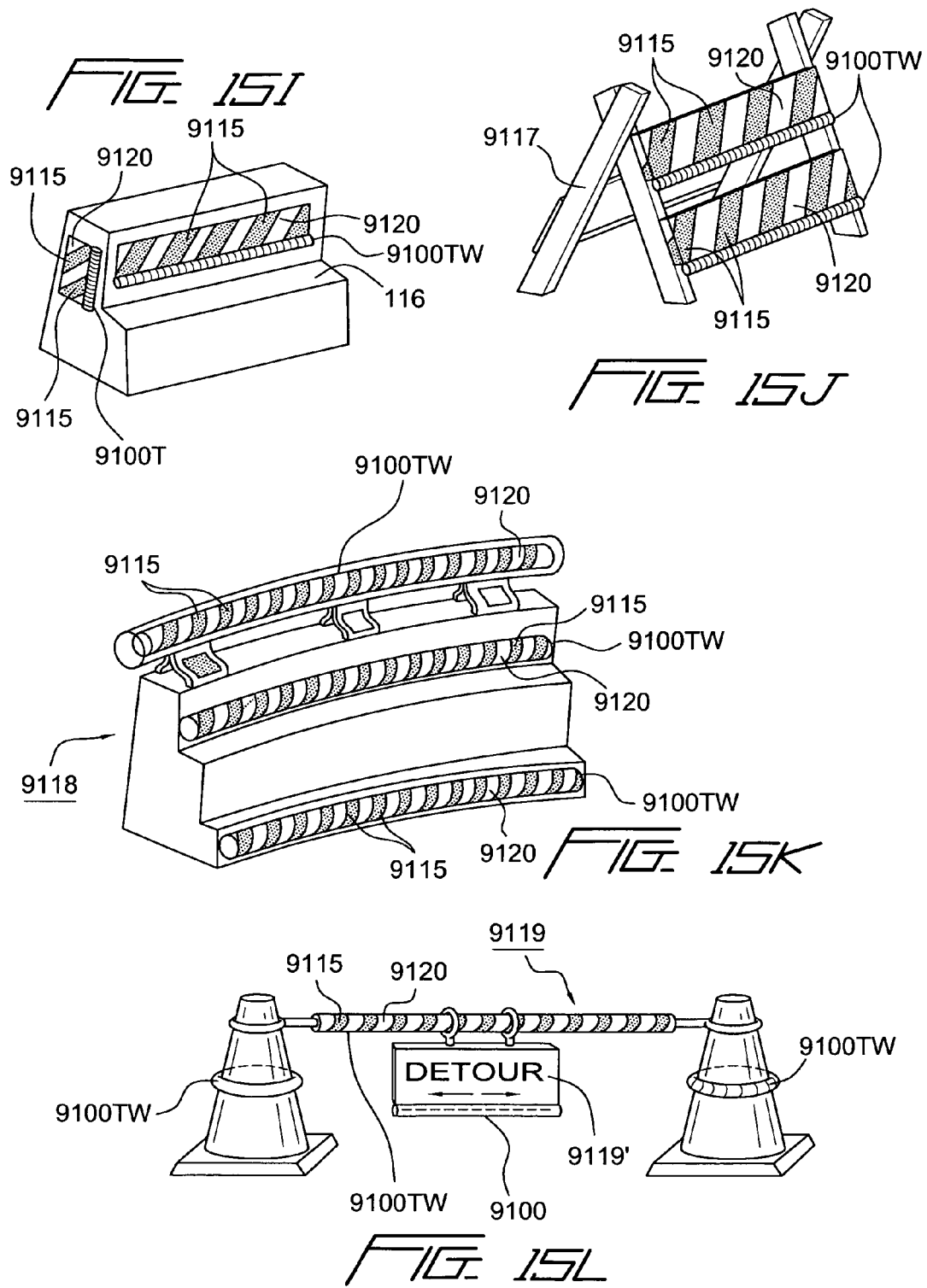

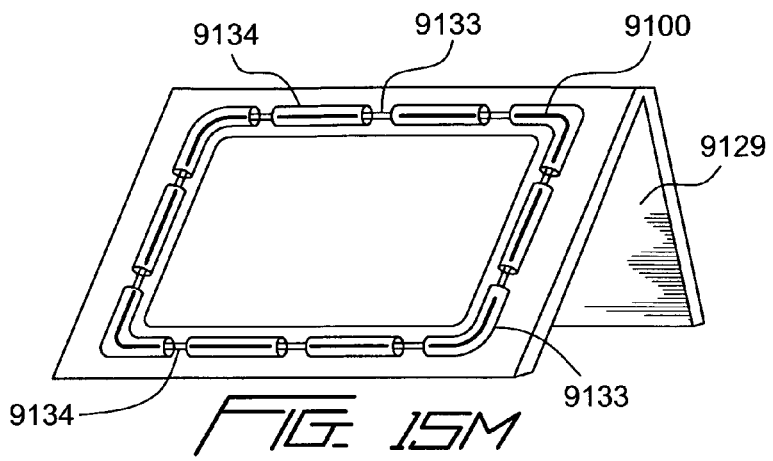
FIG. 15M
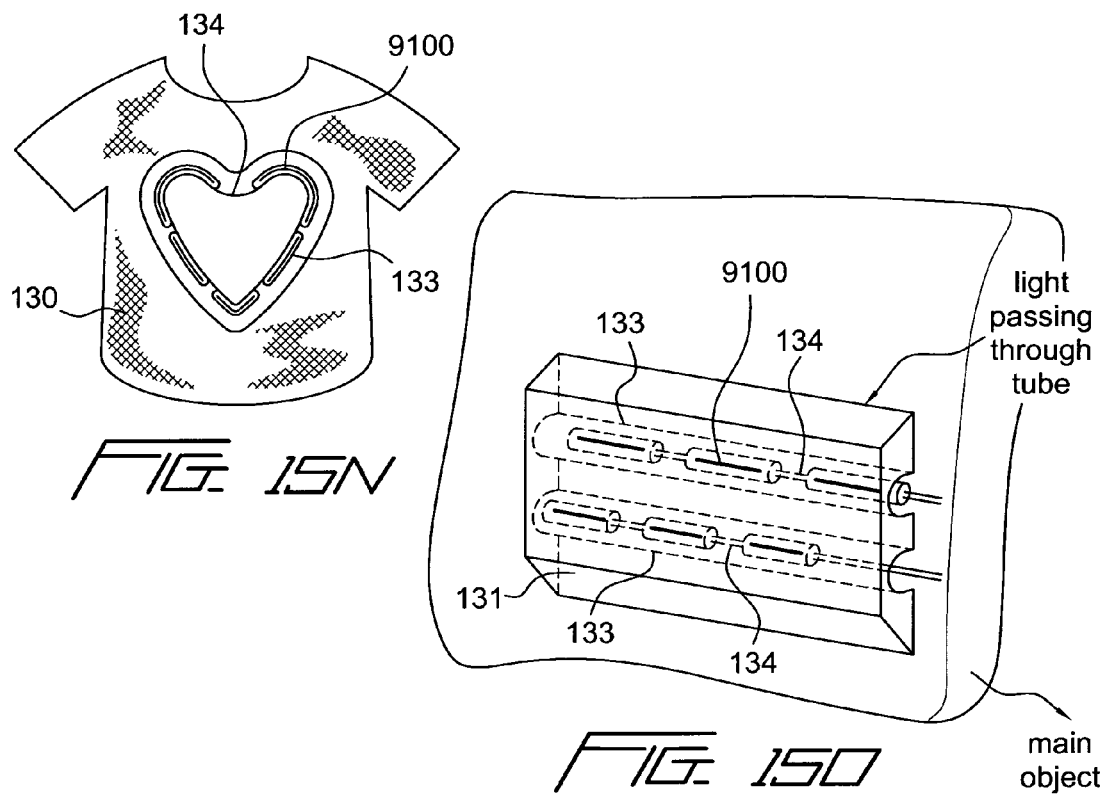
FIG. 15N
FIG. 15O
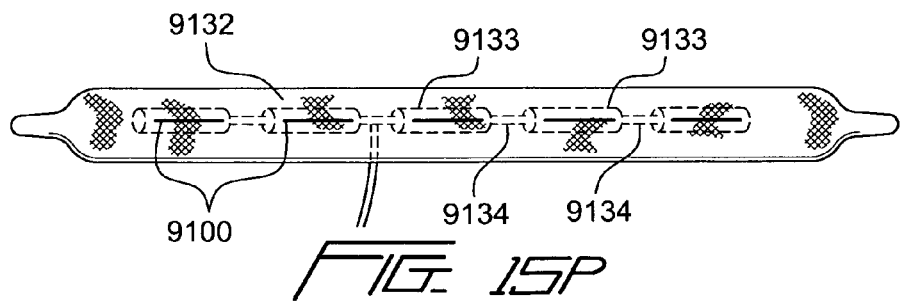
FIG. 15P (Bag/Purse)

(Garment & Apparel)

(Movement Device)

(Headgear)

(Traffic Equipment)

(Hair-Related Item)

(Home-Indoor)

(Home-Outdoor)

(Sign)

(X'mas)

(Garden Lite)

TUBULAR ELECTRO-LUMINESCENT PANEL(S) LIGHT DEVICE

BACKGROUND OF THE INVENTION

Tubular shaped electro-luminescent (EL) light devices are disclosed in U.S. Pat. No. 5,485,355 Voskoboinik et al., U.S. Pat. No. 5,753,381 Feldman et al. and U.S. Pat. No. 5,711,594 Hay, but the tubular shaped light devices disclosed in these patents each has limitations, including: too expensive to produce, too slow production speed, too limited brightness, too difficult to apply, etc.

The current invention uses a low-cost panel type of electro-luminescent element sealed inside a tube shape to provide super lower cost, simple production procedure, super brightness, and the ability to easily be made in any diameter, overcoming the disadvantages of all the US prior arts.

1. The current invention provides a way to make any diameter of tubular EL light device by a simple process.
2. The current invention provides a way to solve the problems caused by a sharp angle while bending the tube.
3. The current invention provides for inclusion of a colored plastic tube for cosmetic purposes to enhance the appearance of a tubular EL light device.
4. The current invention provides a proper wall thickness for the plastic tube to overcome bending problems.
5. The current invention provides a way to make an extended electro-luminescent panel having a desired length.
6. The current invention provides a way to make a multiple color tubular light device for desired effects.
7. The current invention provides a way to make a tubular EL light device with optics features and properties.
8. The current invention provides a way to have a super brightness tubular EL light device.
9. The current invention provides a way to have a tubular EL light device with a bend and fix shape.
10. The current invention provides a way to have a tubular EL light device with twisted panel (s)
11. The current invention provides a way to have a tubular EL light device with back to back panels.
12. The current invention provides a way to have a tubular EL light device with twisted panel (s).
13. The current invention provides a way to have a flat tubular EL light with twisted panel (s)
14. The current invention provides a way to have a magnetic means incorporated with a tubular EL light device.
15. The current invention provides an application for incorporating a tubular light device at the connection point of main objects such as a tool box, automobile door, or truck.
16. The current invention a mixed color for Twisted EL panels to form a cosmetic appearance.
17. The current invention provides a variety of applications for use in connection with different categories of illumination.

The current invention improves the above listed US prior art because it is simple to make all kinds of tube shapes with a desired diameter. Also, the brightness can be designed for any requirement without investment in new machines because the marketplace already has too many available machines that can do so can lower cost and higher speed to make a large quantity and let people have a good light device with lower cost and increased safety.

The current invention also offer a Bend-N-Shape feature as described in a co-pending filing US which offers a great feature as a working lamp so as to offer desired illumination for a certain work environment.

The current invention also offers a twisted EL panel (s) arrangement for consumer application to products such as a Shoe, Slide, Slipper, Saddle, Automobile, Boat, Bus, Aircraft, Garden, Traffic Equipment, Bag, Purse, House, Building, Christmas, Seasonal Item, Bicycle, Tricycle, Toy, Moving Device, Skating Item, Jogging Item, Watch, Garment, Clothing, Jeans, Box, Tool Box, Working Lamp, Furniture, Giftwear, Headgear, Jewelry, Hair Accessories, Partywear, Sign, Indoor Lighting, Outdoor Lighting, Street Lamp, Guide Lamp, Bridge Lamp, Traffic Cone, New Jersey Deck, Fence, Mail Box, House Number light, Window Sign, Wall Sign, Poster, Passway, Stair, Curb, Line Divider For People, Evacuation Light, Fishing Marker, Decoration Device For Safety, Decorating, Advertisement, Promotion, Point-Of-Purchase, Warning Light, Accent Light, Illumination Light, Floor Light, Delineator Guide Light, and Evacuation Light, which currently can be found in the marketplace with other light means such as an L.E.D./incandescent light bulb, fluorescent tube, neon tube, etc. The electro-luminescent panels with sufficient light brightness and very low power consumption have previously been disclosed by the current inventor in a variety of US issued patents including U.S. Pat. Nos. 5,746,501, 5,980,060, 5,722,760, 5,504,397, 5,475, 574, 5,479,325, 5,570,946, 5,469,342, 5,570,945, 5,704,705, 5,611,621, 5,860,727, 5,865,523, 5,879,069, 5,572,817, 5,752,337, 5,794,366, 5,833,508, 5,688,038, 5,871,269, 5,720,651, 5,806,960, 5,947,980, 5,775,016, 5,566,384, 5,876,108, 5,836,671, 5,601,358, 5,754,064, 5,921,653, 5,667,394, 6,082,867, 6,170,958, 6,183,101, 6,171,117, 5,926,440, 6,158,868, 6,182,282, 6,179,431, 5,599,088, 5,213,616, 6,179,431, 6,280,053, 6,170,958, 6,168,282, 5,926,440, 5,683,164, 6,183,101, 6,123,616, 6,280,053, 5,926,440, 5,754,064, 5,879,069 and other issued patents owned by the current inventor. The advantage of such electro-luminescent lighting elements in a variety of contexts are explained in several co pending U.S. patent applications including Ser. Nos. 08/305,294; 08/343,404; 08/343, 915; 08/383,404; 08/383,405; 08/409,925; 08/421,647; 08/432,707; 08/438,373; 08/444,064; 08/436,007; 08/444, 064; 08/489,160; 08/498,258; 08/510,701; 08/522,940; 08/561,973; 08/611,049; 08/614,001; 08/522,940; 08/712, 484; and 08/734,872, which cover more utilities for an electro-luminescent element. All listed inventions can be attached on any single radius surface without any problem.

SUMMARY OF THE INVENTION

The current invention uses a wider tube space to install the narrow EL panel (s) in such a way that the panel (s) have extra space to allow (bend and twist with ugly shapes that cannot be seen by a viewer". It also provides several arrangements to make the tube look like a neon tube or other pretty attractive light arrangement. In addition, the tube with panel (s) can fit on a spherical surface which has more than one radius of curvature and can fit pretty well without an ugly shape that would destroy the value of the light. Also, the invention provides a method that uses limited length for EL panel (s) to provide unlimited length light devices for a desired requirement.

BRIEF DESCRIPTION OF THE DRAWINGS

FIG. 1 shows a tubular EL light device with an EL panel that forms a lighting element having a diameter that is smaller than an inner diameter of a tube.

FIG. 1A shows a tubular EL light device with an EL panel and in which the tube have an inner and outer diameter.

FIG. 1B shows a tubular EL light device with an EL panel and in which the tube has an open groove.

FIG. 1C shows EL elements inside the tube to make a good photometric arrangement using one EL element.

FIG. 1D shows EL elements inside the tube to make a good photometric arrangement using two EL elements.

FIG. 2A illustrates the problem that results when the wall thickness is too thin and a sharp bending angle is applied.

FIG. 2B illustrates a tube with an appropriate wall thickness for bending with a smoothly radiused curve.

FIG. 2C illustrates the manner in which an electroluminescent panel can bend with respect to a Y-axis while extending along an X-axis, but cannot bend relative to the Z-axis.

FIG. 2D shows an EL panel within a tube which has a wider inner space than the EL panel width so that the tube has a certain flexibility with proper wall thickness so that the tube is easily bent with respect to the Y or Z axis while the tube extends along the X-axis. The EL panel width is narrower than the tube inner space so that the panel can be twisted and deformed to allow the tube any degree and direction of bending while still providing good illumination because the tube's wall thickness, color, transparency, and masking will not let the viewer see the twisted, bending EL panel inside even through the viewer can view the good light beams from the outside. This is the main concept for the current invention and allows a tubular EL light device to fit into any single or dual radius surface such as an egg shape. A single EL panel cannot be applied to such a surface with good cost and a simple process.

FIG. 2E illustrates a tubular EL light device that can use simple attachment means to fix the Tubular EL light device on a desired location which may be selected from the group consisting of glue, super glue, hooks, nails, a ditch, groove, exterior tube, U-shaped hook, double-sided tape, foam tape, Velcro, Velcro tape, solvent, chemical bonding material, wax, ultrasonic bonding, hot sealing, stitching, and sewing for fixing the tubular light device on main objects.

FIG. 3 shows a tube that is properly colored to prevent an inner EL element from being seen while non-lit.

FIG. 4 illustrates a wall thickness of the tube for better selection to meet the desired requirement.

FIG. 5A shows a method of making a desired length of tubular EL light device by an overlaying process.

FIG. 5B shows a method of making the desired length of tubular EL light device by a side-by-side arrangement.

FIG. 5C shows details of a method of making a bus line for delivering electric-signals without losing energy.

FIG. 6 shows a method of making a multiple color scheme for the EL elements of a tubular light device.

FIG. 7A shows an optics arrangement for a tubular EL light device with an inner optics arrangement.

FIG. 7B shows an optics arrangement for a tubular EL light device with an outer optics arrangement.

FIG. 8 shows a Bend-N-Fix shape feature of a tubular EL light device that incorporates a non-elastic means at a desired location and a non-elastic means to enable the tubular light device to stay attain the shape, curvature, and configuration for a desired requirement.

FIG. 8B shows an alternative arrangement for non-elastic means located on the outer location of a tubular device so to offer the Bend-N-Shape if FIG. 8A and FIG. 8 for different treatment of elements.

FIG. 8C shows twisted EL panel (s) which have a single side with a phosphor for a single surface to provide light output while connected with electric signal ends.

FIG. 8D illustrates the photometric theory for the twisted EL panels within a tube which have multiple electrodes for different color and areas with desired light function, color, brightness, lit-size for desired light effects based on requirements with at least one non-elastic means to keep the Bend-N-Shape features for this tubular light device.

FIG. 9 shows an EL light device with 2 pieces of EL panel (s) put together on a back side, with the light therefore being emitted from two opposite surfaces.

FIG. 9A shows a tubular EL light device with two pieces of EL panels joined together by available fixing means including Glue, Double Sided Tape, Velcro, Hook and Loop Fasteners, Hot Sealing, Ultrasonic or equivalent means available in the conventional marketplace.

FIG. 9B the light emitting direction of a tubular EL light device having 2 EL panels with a back-to-back arrangement. The two EL panels light is emitted out and hits the inner tube surface to make a properly reflective or randomly reflective, passing though tube to provide excellent light effects which look like a neon tube. The diameter of the tube and the width of the EL panels can be changed as required to attain a certain brightness, diameter, color, function, duration, flashing rate or the like.

FIG. 11 shows a tubular light device with EL panel (s) within the tube and incorporated with magnetic means at a desired location of the tube, which can easily be fixed on any metal surface such as a vehicle, transportation equipment, refrigerator, elevators, escalator, and traffic equipment. When incorporated with non-elastic means, the lighting device only needs a single magnetic means that can offer simple installation with desired illumination for any purpose.

FIGS. 12 and 13 show a tubular light device for a tool box application. It can be workable for any kind of box including a traveling box, tool box, fishing box, lunch box, jewelry box, cosmetic box, gift box, toy box, packing box or the like for containing objects with illumination. The tubular light device may be especially designed as a working lamp, as shown in FIG. 13, for desired brightness, color, features, functions, and construction.

FIG. 14 illustrates an alternative embodiment for applying the tubular light device for transportation equipment including a van, RV, car, train, boat, ship, aircraft, submarine, tank, and motorcycle (for indoor and outdoor applications.

FIGS. 15-17 illustrate a preferred embodiment for applying the tubular light device for footwear including indoor and outdoor slippers, sport saddle, boots, athletic shoes, beach slippers, casual shoes, snow boots, skating, working boots, and other footwear for people to wear on foot. The tubular light device can be arranged at any desired location on any part of the footwear such as a shoelace, tongue, shoe surface, outsole, button, sole, straps, or supports for illumination.

FIG. 15 illustrates a preferred embodiment for applying the tubular light device to footwear including indoor and outdoor athletic footwear, casual footwear, boots, and skate boots, and in which the tubular EL light can be a piping, decoration strap, tubing, lace, delineator, line for a button, shoe upper, support, or shoe tongue as illustrated.

FIG. 17 illustrates a preferred embodiment for applying the tubular light device to footwear including indoor and outdoor sport saddles in which the tubular EL light is used as piping, tubing, decoration straps, tunnel piping for the sole, a button, gel piece, upper support, or strap for designed illumination. The tubular light device can use a flat type panel (s) or twisted type panel (s) within the tube.

FIGS. 15A-15H6 illustrate a preferred embodiment for applying the tubular light device to footwear including indoor and outdoor footwear for different installation on a shoe upper, button, gel piece, gap or seam, shoe tongue, shoe lace, decorative strap, or Velcro band with the desired flat-panel or twisted-panel (s) within a desired tube with designed construction for desired light effects. The drawings are similar to drawings included in the inventor's U.S. Pat. No. 6,082,867 but with different construction for the basic tubular EL panel light device v.s. the "3D electro-luminescent element".

FIGS. 15I-L illustrate a preferred embodiment for applying the tubular light device to traffic equipment (s) including (I) a New Jersey deck with tubular lights, (J) a barrier with a tubular EL light, (K) a highway ramp with a large diameter light on top of a wall with stands, a middle diameter tubular light on the wall of the cement upper location, or a lower portion with a smaller tubular light device as ground delineator, (L) a combination application for two traffic cones with a lighted bar with two ears and a proper sign hanging on the bar. The tubular light device can be applied to a traffic cone, bar, or sign for better visibility by a road user.

FIGS. 15M-15P illustrate a preferred embodiment for applying the tubular light device to a variety of applications that include a Sign, Frame as in FIG. (15M; Garment, Apparel, Jeans as in FIG. (15N; Automobile, Transportation Equipment, Car, Van, RV, Boat, Aircraft, Bus, Door Guard, Evacuation Guide, Bumper Light, Step Light, Static Band Light, Mud Flap Lighting, Indoor Accent Light, Decoration Light for Transportation Equipment; or Textile Application as Lace, Band, Strap, Belt as in FIG. (15P, the tubular EL light being installable within the textile material.

FIG. 29 illustrates a preferred embodiment for applying the tubular light device to a application.

FIG. 30 illustrates a preferred embodiment for applying the tubular light device to a toy with movement device including a racing car, moving toy, tricycle, vehicle, skates etc.

FIG. 31 illustrates a preferred embodiment for applying the tubular light device to game items preferred for floor mat application such as Dancing Game, Alpha-Beta, Mathematic Game, Scissors/Rock/Paper etc FIG. 32 illustrates a preferred embodiment for applying the tubular light device to furniture such as a table chair, desk, showcase, shelves, rack, stand for promotion, point-of-purchase, advertisement, etc.

DETAILED DESCRIPTION OF THE PREFERRED EMBODIMENTS

Figure 8A:
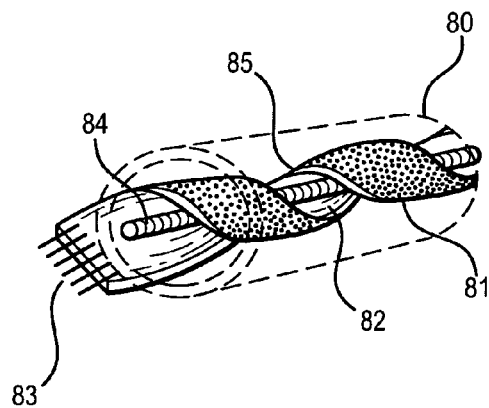
FIG. 8A: Disclosure the twisted El panel (s) within a tube with a non-elastic means on proper location to offer a "Freeze Shape" after bend the tubular light. The non-elastic means can be a metal wire or the like similar function material (s).
Figure 9C:
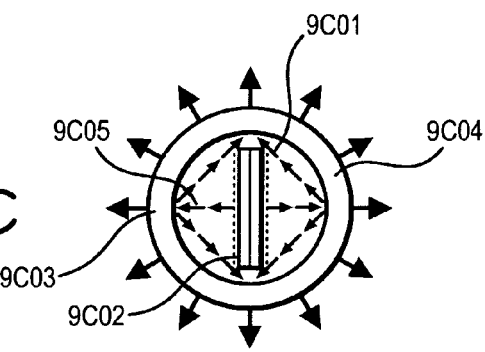
FIG. 9C illustrates the light beam's path for twisted/coiled EL panels in multiple directions to create the 3 dimensional direction of a traditional neon or fluorescent tube.
Figure 10B:
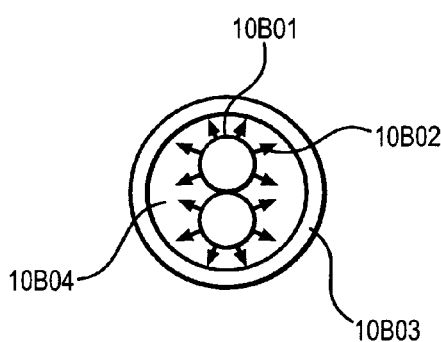
FIG. 10B illustrates EL panels with multiple light emitting direction (s) to form a tube light that provides lighting effects similar to those of a conventional neon, fluorescent, or PIR tube light.
Figure 10:
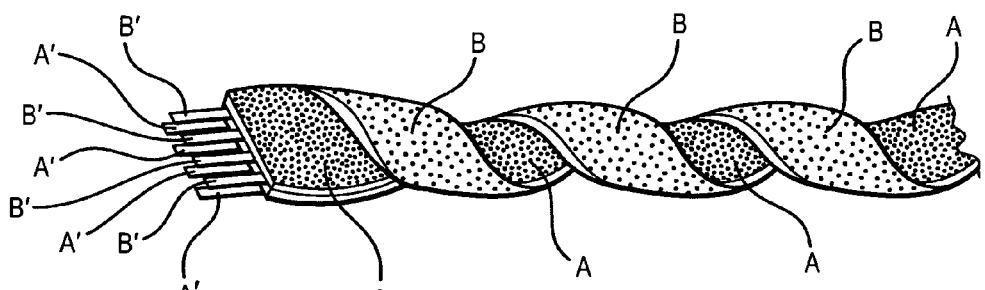
FIG. 10 shows twisted EL panel (s) which have two electroluminescent panels fixed together back to back with multiple electrode (s) of each panel to provide a desired function, brightness, lit-area (s), and/or color (s). Each panel can have its own phosphor arrangement for color, area size, shape, and brightness.
Figure 10A:
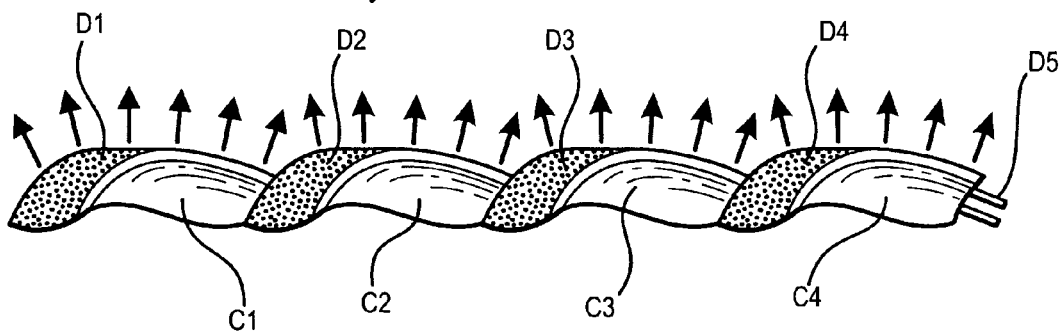
FIG. 10A shows a single EL panel for twisted treatment for certain directions with the light emitted out.
Figure 17:
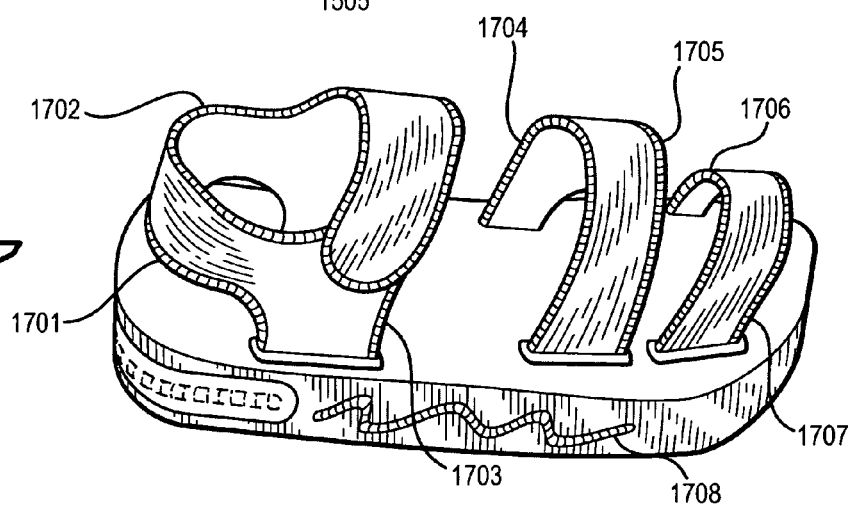
Figures 16A, 16B, 16C:
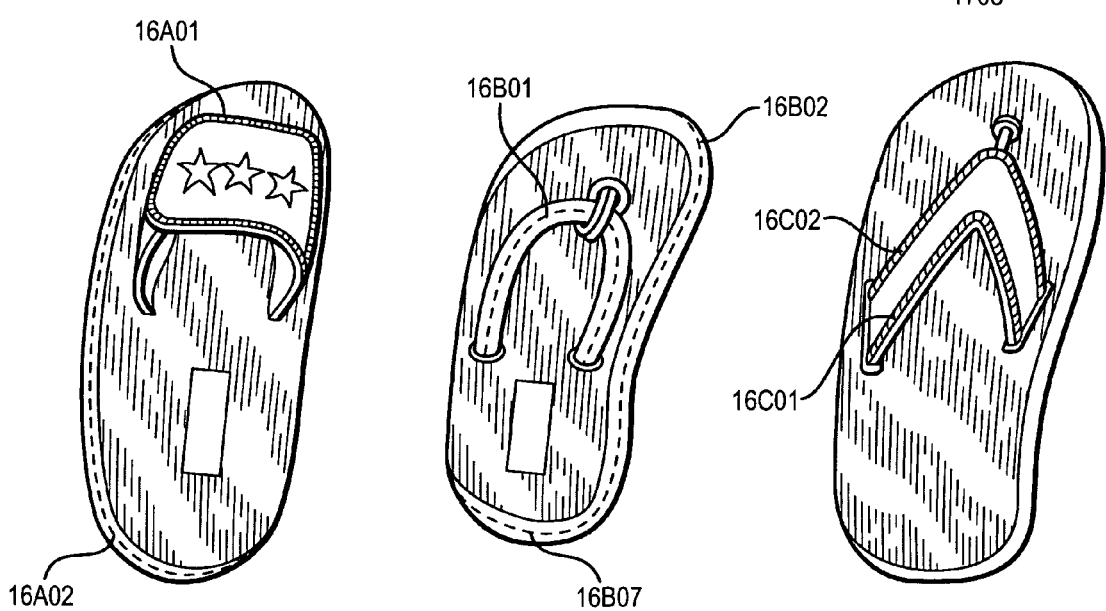
FIG. 16A shows a preferred embodiment for applying the tubular light device to footwear including indoor and outdoor slippers, slides, and saddles for all purpose wearing. The tubular EL light device can be applied as piping, tubing, decoration straps for the upper surface or sole, or as a button arrangement.
FIG. 16B shows a preferred embodiment for applying the tubular light device to footwear including indoor and outdoor slippers, slides, and saddles for all design concept such as the current invention drawing. The tubular EL light kits can fit a shoe upper surface, support, button, sole, tubing, and piping with a desired tube color and transparency for desired light illumination effects.
FIG. 16C shows a preferred embodiment for applying the tubular light device to footwear including indoor and outdoor slippers, slides, and saddles for all environment wearing, the tubular light device serving in the current embodiment as a piping, decoration strap, or tunnel for the footwear.

The current invention relates to electro-luminescent panel (s) incorporated with tube-means having a pre-designed wall thickness, color, transparency, and softness to allow the said panel (s) to follow the tube curvature and be attached to main objects. The improvement includes providing enough space to allow the panel (s) to freely move, change shape, bend, and twist within the tube so the lighting device can easily be attached to a variety of surfaces to provide pretty neon and fluorescent tube light effects with desired function.

FIG. (1) shows a tube means (10) and an inner narrow electro-luminescent panel (11). FIG. (1A) shows a tube means (12) and a panel (13). FIG. (1B) shows an alternative tube means (15) which has an open groove that provides a space to install the (panel (s) (14) within the tube-means. The preferred tube means can be have a variety of desired designs as in the above drawings as long as the (panel (s) can freely move within the space. The free movement of the panel (s) is a very important issue for the current invention because the panel (s) have the limitation as illustrated in FIG. (2-C) that the panel (201) can only bend in a limited manner, for example at the line (201B), which refers to the x-y-z axis. An EL panel sitting on or extending along the x-axis can be bent to any degree of the y-axis. The phosphor coated area (201C) can be on either side to emit light. However, the El panel (202A) sitting on the x-axis cannot bend in any direction with respect to the z-axis as shown in FIG. (2-c). The curved panel area (202B) has to be curved while making the EL panel, which otherwise cannot bend to get the side curvature. This is a major (problem with an EL panels that limits their application in the absence of some special arrangement, as in the current invention discussed hereafter.

FIG. (2D) shows a panel (203A) arranged within a tube means (203B), the tube means having a bigger inner space to allow the panel (203B) to be twisted at (203D) (203G) in a way which will not been seen by outside of tube means. This can be easily accomplished by using a opaque or thicker wall thickness as in FIG. (4), with D24 providing a thicker wall to prevent seeing through to the inner space. FIG. (4) shows a wall D14 which have a very thin wall thickness requiring use of a colored tube means to get an attractive result. This also can allow the panel (203B) to offer good light effects along the tube length by incorporating two panels glued together back-to-back as one single panel assembly. in that case, both sides emit light such that (203E) with (xxx) marked is one panel and (203F) with ( . . . ) marked is the other panel. Even if the panels have been twisted at the bending point (203D) (203G), they still have enough illumination, as is apparent from FIG. (3) ((. However, the wall thickness should be selected to prevent too thin a wall FIG. (2A) from having a "Sharp Tip" upon bending. The proper wall thickness should make a smooth tip (17) when being the tube. This is very important while selecting the tube specification.

FIG. (1C) shows a preferred arrangement to get light emitted from two side surfaces out to viewers. One long panel (60) with phosphor coated on one side in the same manner as a traditional panel is bent at or near center area <R> bigger than the minimum bending radius of the panel so there will be no harm to the panel quality. Bending the panel at a center point to get two side to emit light is a simple process. FIG. (1D) shows an alternative preferred arrangement to get two side surfaces to emit light by joining together two separate (70) (80) panels back to back so get the same result as FIG. (1C). FIG. (5A) illustrates a method to obtain an unlimited length for the tubular EL panel light device by joining two EL panels (19) (20) at the electrode ends and overlaying one on top of the other with traditional soldering or pressing to permit electric delivery to one another. However, this will make the electric signals become too weak because all the electric signals have to overcome all electric resistance within the EL panel's conductive layer so the brightness is not good. This is also a very big defect of US prior art Voskoboinik U.S. Pat. No. 5,485,355 because the outer coil electrodes are way too thin so they only can carry limited current and can only supply a limited length. The current invention prefers to use a traditional electric-wire, flexible printed circuit (FPC), or conductive means such as bus wires which have super low electric internal resistance and can carry sufficient current over a long distance like a ten time extension cord, such that each location can have the same current data as the first position at the output end of the electric signal source. As illustrated in FIG. (5B), each panel may have its electrodes connected with bus wire (L.) (L.) (L.) (L.) at the position of (21) (22) (23) (24). The bus wire with super low internal resistance can carry sufficient current over a desired length, and hence there will be a very good signal current into each panel to enable each panel to have the same brightness. This solves some of the defects of the lighting element disclosed in Voskoboinik U.S. Pat. No. 5,483,355. The bus wire (L.) connected with (L.) (is connected (by a traditional electric connection metered to enable the bus-wire to have unlimited length as desired.

FIG. (5C) shows a bus-wire (L11) (L12) having extra pieces (25) (26) extending beyond the panel's end which form terminals for easily making connections with other bus-wires. The bus-wire material can be selected from the group consisting of an electric wire (27), flexible printed circuit (FPC) (28), and conductive means (29) which may be a single piece or a multiple piece inner conductive wire as indicated by reference numerals (27') (28') (28") to enable proper electric signal delivery for designed functions, brightness, features, and thickness.

FIG. (6) shows a preferred multiple color tubular EL panel light device. The EL panel (30) has different color phosphors or masking colors on the areas (31) (32) (33) (34) (35) (36) (37) (38) with pre-designed wire connection to the electrodes. The color patterns (1) (2) (3) (4) (5) (6) may use phosphor original colors or adapter masking, stenciling, silkscreening, or filtering to make the color of the emitted light beam appear different to a viewer. The electrodes can have common terminals or the device can have separate electrodes for each colored area. This depends on design requirements for each of the colors with common or individual electrodes. The Voskoboinik US prior art cannot achieve this multiple color design with separated areas and with different light effects on one tubular light device.

FIGS. (7A) and (7B) show a tubular light device with preferred optic-means to get special light effects or block out the inner panel's ugly shape. FIG. (7A) inner optical teeth (42) that give the appearance of a lot of shining lines when people see the tubular light device (40) from outside of tube (41). The alternative of having the optics-means (52) on the outside surface of tube (50) can also give the appearance of special shining lines to the viewer. This not only offers special optics properties including enlargement, multiple light images, block out the see-through properties and patterns, for different market requirements. FIG. (2-E) shows one preferred attachment of the tubular EL panel light device on any surface by glue (204C) on an object (204D) to position the EL panel (204A) to let the phosphor areas (204B) emit light beams to viewers while the two electrodes' wires (204E) are connected with a signal source (not shown).

FIG. (8) shows a Bend-N-Shape arrangement. The EL panel (91) emits light beams from phosphor coated areas beams as indicated by respective arrows. The device includes a non-elastic means (93) which has the property that when one bends it, it will keep the curve and fix that curve. This property an be achieved by a metal wire or garden wiring which has a metal wire inside to provide the Bend-N-Shape property. The current invention incorporate colored tube-means, low transparent tube-means, or thicker wall thickness tube-means to prevent people from seeing through the tube while still allowing the light beam to be visible from outside of the tube. Based on this non-see-through feature combined with the Bend-N Shape feature, the Tubular EL panel light device can become a working lamp with self-power pack or power source and signal source incorporated with magnetic-means (not shown) for more wide installation and application using a pre-determined bigger diameter of tube-means to load bigger EL panel (s) for much higher brightness according to market requirements. The wider panel (s) can get much brighter brightness than is possible using the Voskoboinik US prior art, in which the one outside coil wire has too limited current to be carried a longer distance because internal resistance overcomes the current and creates heat.

FIG. (8C) shows twisted EL panels having a phosphor coated on one side (8C02) and not on the other side (8C01). As a result, only light emitted out from areas marked with ( . . . ) is visible. The panels may have multiple electrodes (8C03) for special arrangement of all phosphor coated areas (8C02) to provide motion light, chasing, random, scan, pair flashing, and other light effects using commercially available integrated circuits (I.C.).

FIG. (1a) shows details of the device illustrated in FIG. (8) with the phosphor coated areas (81) and non-phosphor areas (85) being twisted at the desired distance point (82) within a tube (80) and with a non-elastic means (84) passing through the twisted hole and multiple electrodes on one end to connect with a signal source for desired light effects and functions.

FIG. (8B) shows an alternative method to offer a Bend-N-Shape feature for a tubular EL panel light device. The tube (8B04) has its outer PVC layer with thickness (8B01) and EL panel (s) within this inner space. The outside PVC layer has a small tube (8B03) which can be used to make the tube-means (8B04). A non-elastic means (8B02) is arranged within the small hole (8B03) so as to offer the bend-n-shape features. The outer small tube means also can provide a fixing means feature bearing this additional piece above the tube means (8B04). FIG. (8D) light emission using a single phosphor-coated surface (8D03) twisted so that each viewing angle can see light with a same ratio for lit-areas and non-lit-areas (8D03) (8D04) which offer a very valuable appearance. However, the single side illumination panel with illumination along the same length of tube-means will have ½ the cost of a two sided illumination panel assembly so this feature results in significant cost savings. From FIG. (8D), one can see the attractive appearance of even a single side illumination EL panel, which again is not possible for Voskoboinik US prior art. Also, the cost is around ¼ of the Voskoboinik device. The light arrangement indicated by the arrowhead for each viewing position will have the same light effects. FIG. (9) shows an arrangement of two EL panels fixed together by glue back to back. The two panels (901) (902) are conventional panel units with the phosphor coated on a single surface as shown. The two panels are glued together by glue, double side tape, Velcro, a solvent or traditional adhesive means to let this become a single assembly in which, as shown in FIG. (9A), the two phosphor coated surfaces (906) (907) face outside and, as shown in FIG. (9B), the two EL panels (911) (912) have sufficient light output to hit the inner wall of the tube means (913) to get the best light effects and look like the Neon tube. The two non-elastic means (910) (909) are well arranged within the tube means (913) with preferred masking, color, transparency, wall thickness, filter, and/or silkscreen so that the two non-elastic means (910) (909) will not be seen from outside. The two non-elastic means can offer a desired bend-N-shape feature. It is preferred to use a single non-elastic-means instead of a two piece of non-elastic means. FIG. (9C) shows the EL panels within a tube means (9C03) with two panels glued together by glue, double side tape, Velcro, or solvent, and in which the light emitted out from two phosphor coated surfaces will pass though the space and hit the inner wall to provide reflective or random reflective effects, the light passing through the wall in all directions, the tube means having a desired wall thickness, transparency, and color to provide neon tube light effects. The same concept can be used with twisted EL panels such as the ones shown in FIG. (10B).

FIG. (11) shows a tubular EL panel device (1100) which has the desired EL panels within the tube means and also has one magnetic means (1101) installed on the tubular EL panel light device, the magnetic properties of which allow the light device to be attached to any metal surface or metal objects. The magnetic means can be installed on the surface of the tube means, on a wall, or on the inner side, to allow people to attach the EL panel device without an unsatisfactory appearance and quality concerns. The magnetic means (1101) can use glue, screws, ultrasonic sealing, hot sealing, solvents, traditional fix means, or other attachment means to install the magnetic means on the tube means. The tube means also can be combined with non-elastic-means to offer the bend-n-shape features, such as at the bending points (1102) (1103) (1104) (1105). The brightness of the tubular EL panel light means (1100) can be arranged according to the desired EL panel size, phosphor quality, inverter size, and tube inner space to make a proper brightness for marketing requirement. For example we can have an EL panel with 10 mm width with EI-23 inverter system to get a super brightness than an EL panel with only 2 mm width with EE-10 as the inverter system. However, even the 2 mm width with EE-10 inverter still has a much bigger number of brightness than US PRIOR ART Voskoboinik because the limited area for the outer coil electrodes is too small and Voskoboinik cannot use a bigger coil because in that case the bigger coils cover the illumination areas and reduce the brightness. From FIG. (13) the tubular EL panels device (1301) includes a desired EL panel with sufficient brightness within the tube means. The tubular device can easily be installed on the top of the lower box by a snap-on to the edge, so that the EL panel tubular light device can, for example, be installed on a tool box. When the tubular EL panel light device (1301) is turned on, the light will be emitted on all directions as indicated by reference numeral (1302) to let all tiny things inside the box be seen. This brightness can be as much as wished because the EL panel can be driven by an inverter system to make enough brightness. When the tubular EL panel light device remove from the hook fasten means, the light device will change shape from (1301) U-shaped to the " - - - " Shaped as (1306) center piece with two side (1305) (1304) which are bend the tubular device from (1305') (1304'). This shape changed basing on inner tube non-elastic means to offer the bend-n-shape function as discussed above. From FIG. (13) an electric wire, conductive means (1303) with shorter form can be also become a longer form (1303') while the tubular EL panel light device remove from "U" Shape to " - - - " shape. It also can become the design shown in (1303") with a much longer form and a quickly connecter-means to hook with alternative tubular EL panel light device (1310), which is preferably self-contained to include a proper electric circuit and power source to be incorporated with the box's assembly for a desired function. The box's assembly may have the inverter system and power source system so the container (1309) will only need to handle a quick adapter system to deliver electric signals to the EL panel means. It also may have an alternative design in which the container (1309) has an inverter system and batteries system so the box assembly is used for back up batteries purposes only. While the container (1309) with self contained inverter and batteries, providing an individual working lamp with sufficient brightness, a self power source, and a bend-n-shaped feature to work with an all purpose working lamp. However, the box, the light device, the power pack, inverter, power source can be any combination to make proper final products to meet market requirement.

FIG. (12) shows a preferred embodiment in which the tubular EL panel (s) light device of the present invention is incorporated with a tool box. The tool box has one cover (1200) and hinge (1204) with a button (1203) and groove, catcher, ditch, Velcro tape, or hook to allow the tubular light device to be installed and removed as required. While the box is closed, a portion of the arc of the tubular light device is visible above the surface, which can offer light for certain requirements too.

As shown in FIG. (10), two EL panels may be brought together and twisted with multiple electrodes to obtain desired lit-areas for special light effects including: Chasing, Random, Pair Flashing, Scan, Fade in/out, and other light functions. Suitable integrated circuits arranged to drive the different lit-areas for desired functions are commercially available. Panel A includes a phosphor coating (A) having its own electrode to connect with a signal source. Panel B has a phosphor coating (B) having it own electrode to connect with a signal source. The two panels can thereby provide two-sided illumination with a twisting process so as to endow the whole tube means with neon light illumination. This is very good quality without any breakage issues.

As shown in FIG. (10A), the single phosphor coated twisted EL panel can have lit-areas (D1) (D2) (D3) (D4) visible at the same viewing angle. The other lit-areas (C1) (C2) (C3) (C4) emit light in an opposite direction relative to (D1) (D2) (D3) (D4), but at any angle the viewer will see the same lit-areas and non-lit-areas with the same visual result. This twisted single panel arrangement will have very high value because there has been no other light means having this effect before today.

FIG. (14) shows an embodiment useful for an automobile, transportation equipment, train, bus, RV, car, aircraft, or ship incorporated with a tubular EL panel light device to provide an inside accent light, outside warning light, decoration light, or safety light. The device can fit on the inner side, including on the mat, door, chassis inner side of the car surface, seat, dash board, handle bar, or inner body. It also can installed on the outside of the car, equipment, train, bus, RV, aircraft, or ship and incorporated with proper attachment means as in the tool box example. The preferred outdoor decoration or warning light can be installed on the following elements: (1417) hood, (1410) fender, (1415) wheel trim, (1416) door gap, (1418) door body trim, (1415) rear door trim, (1413) mud guard light, (1419) rear fender guard, (1410) tuck cover, (1414) indoor or outside of windows, (1413) truck gap, (1412) rear bumper, (1411) or static electric belt. These applications are very good when incorporated with a tubular EL panel light device.

This is an especially good application for automobiles to provide desired brightness and colors.

FIG. (15) shows a tubular EL panel light device installed on the following elements of footwear: (1501) rear sole, (1502) piping for edge, (1503) gel piece, (1504) shoe upper surface, (1505) shoe button side, (1506) joint edge for button and shoe upper, (1507) shoe front surface, (1508) shoe lace, or (1509) shoe tongue because the tubular light device can bend to any direction and shape to follow a whole shoe's configuration without any limitation as pointed out in the earlier discussion of EL panel defects. The EL panels within the tube means solve all these limitations and can make good piping, decoration strap for decoration, warning, safety light for all kinds of footwear include an athletic shoe, casual shoe, boot, or working shoe. A shown in FIG. (15A), the tubular light device can be installed on the footwear (998) in the position of: (9101) lace, (9102) Velcro-strap, (9103) decorative strap with hidden wire (9104) under the shoe upper surface, (9105) tunnel arrangement for a decorative strap, (9106) refit decoration strap, (9107) gel piece including shoe upper, sole, or button location. The light device also can be installed on the shoe tongue, shoe toe, shoe join edge etc depending on market requirements. The light kits (9100T) can use a twisted EL panel arrangement with single side illumination or two side illumination for special light effects to meet market taste.

FIG. (15B) shows the tunnel decoration light strip arrangement. The EL panel (9100) is within a tube means (9103) passing though the tunnel (9105) as shown in FIG. (15C). In order to save cost, the light device under the tunnel (9105) can use electric conductive means such as electric wire instead of a tubular light device. FIG. (15D) also shows decoration light kits passing though the rivet (9106) hole and under the shoe upper to another refit hole (9106) to make a special shoe design to meet market requirements.

FIG. (15E) shows multiple piece tubular EL panel light devices inside a stitchable holder with two plastic pieces (9120') (9120") for stitching on footwear shoe upper areas or at a desired location.

Figure 15:
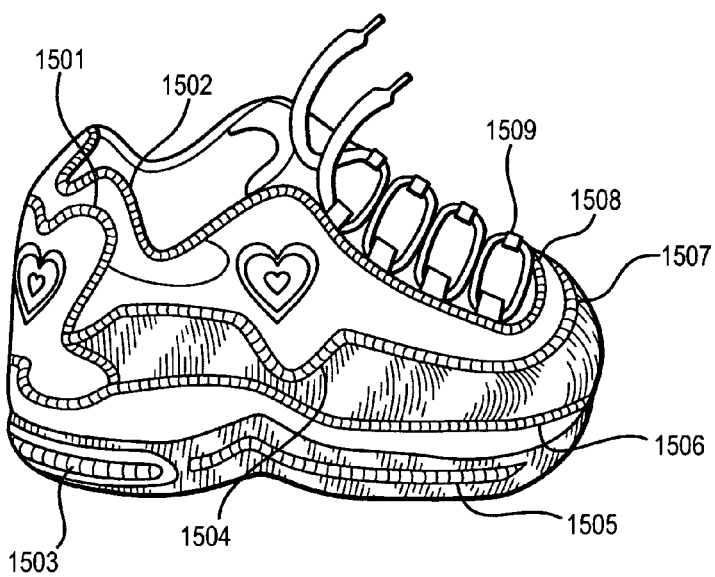
Figure 15A:
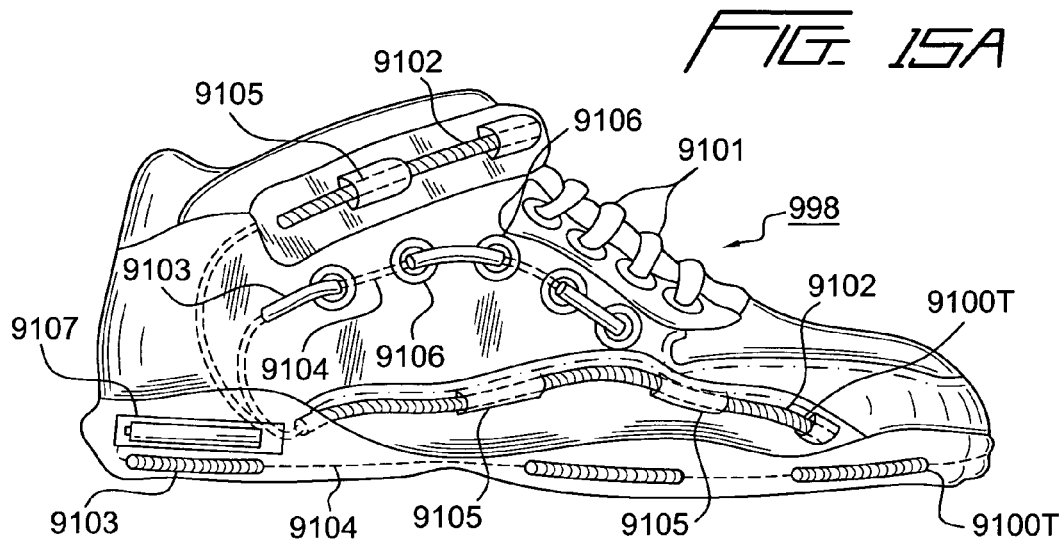
Figure 15B:
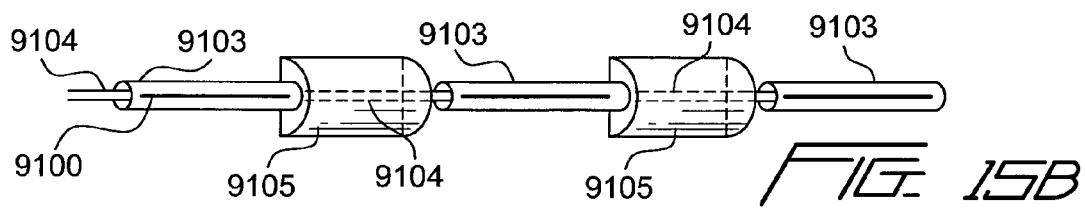
Figure 15C:
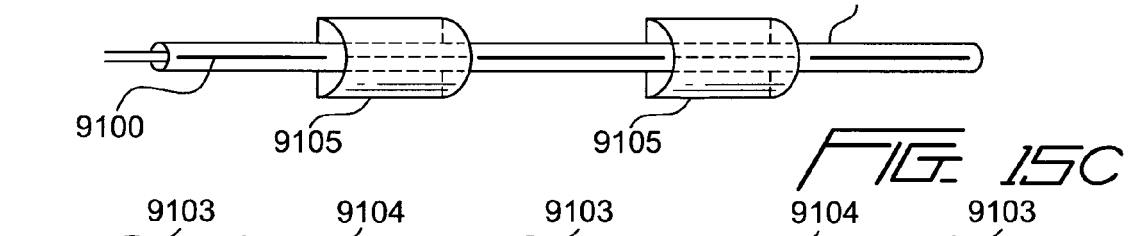
Figure 15D:
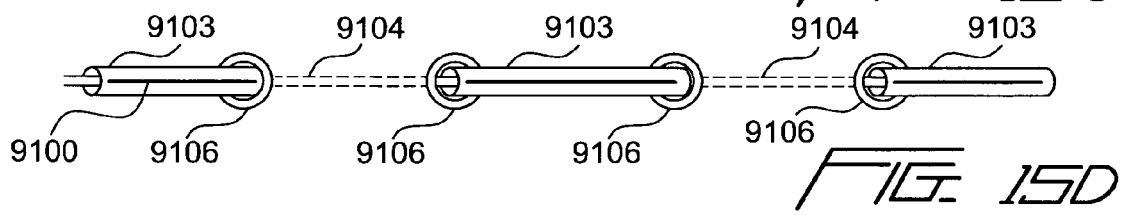
Figures 15E, 15F:
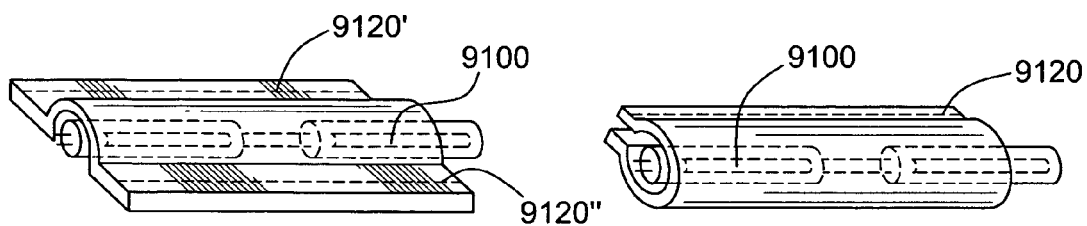
Figure 18:
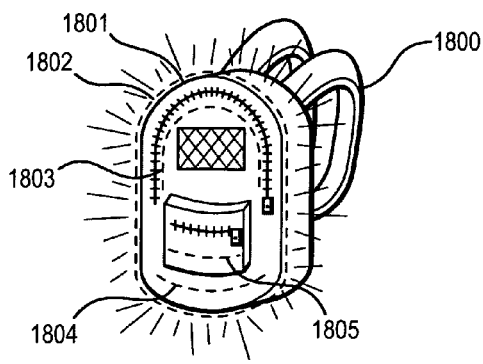
FIG. 18 illustrates a preferred embodiment for applying the tubular light device to all kinds of bags including a purse, backpack, shopping bag, hand bag, traveling bag incorporated with a tubular light device for inner or outside illumination as required.
Figure 19:
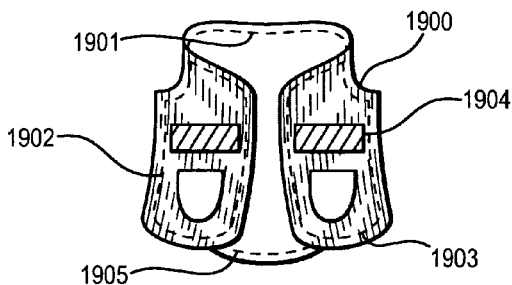
FIG. 19 illustrates a preferred embodiment for applying the tubular light device for clothing including a vest, jacket, clothing, jeans, t-shirt, sweater, and other apparel for decorating piping or safety light features or other special requirement for fashion of illuminated apparel.
Figure 20:
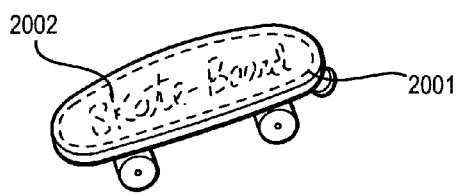
FIG. 20 illustrates a preferred embodiment for applying the tubular light device to a movement device including in-line skates, a skate board, ice skates, toys with wheels, a motor vehicle, cycles, tricycles, baby walker equipment, a handcart, a wheel chair, or the like with small surface resistance design to provide a desired illumination arrangement.
Figure 21:
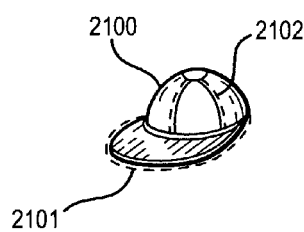
FIG. 21 illustrates a preferred embodiment for applying the tubular light device to headgear including a cap, visor cap, helmet for all purposes, and head related items including hair clipper, hair band etc.
Figure 22:
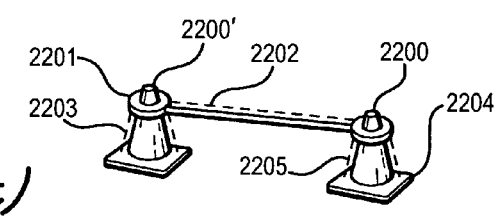
FIG. 22 illustrates a preferred embodiment for applying the tubular light device to a traffic device including traffic cone, delineator bar, New Jersey isolator, fence, block, sign, or highway guide designed to provide illumination with a desired flashing rate, brightness, color, and/or functions.
Figure 33:
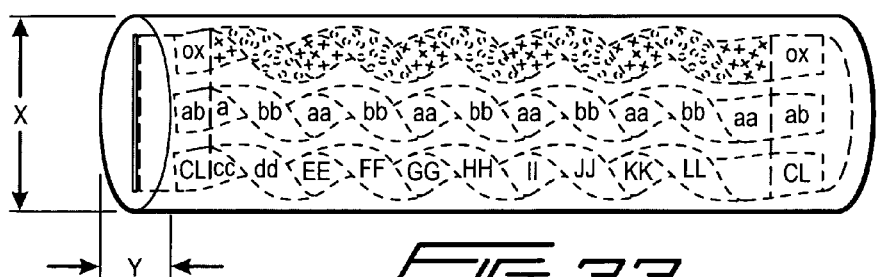
FIG. 33 illustrates a preferred embodiment for applying the tubular light device to jewelry such as a pin, bracelet, hair clipper, button, hair band, hair clipper, necklace, arm band, belt, etc.
Figure 23:
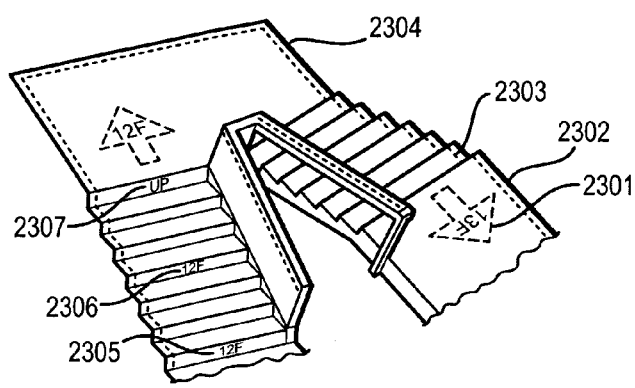
FIG. 23 illustrates a preferred embodiment for applying the tubular light device to indoor lighting of a house or building.
Figure 24:
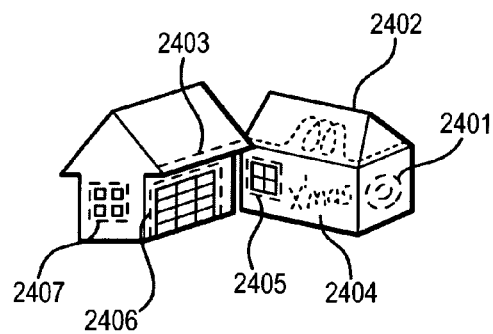
FIG. 24 illustrates a preferred embodiment for applying the tubular light device for outdoor lighting of a house or building.
Figure 25:
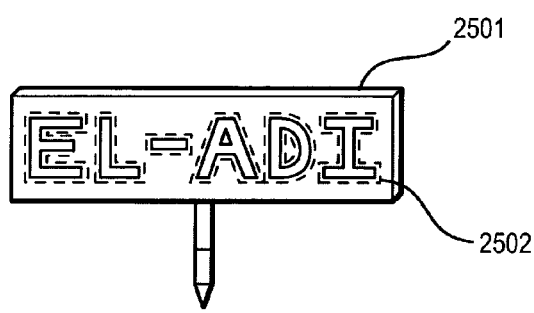
FIG. 25 illustrates a preferred embodiment for applying the tubular light device for all-purpose sign application.
Figure 26:
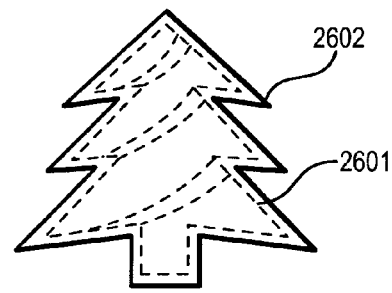
FIG. 26 illustrates a preferred embodiment for applying the tubular light device to Christmas lighting for a tree, tensile (or twisted EL panels, an angel, tree top ornament with a desired configuration, a doorbell light, window sign, window slogan, outdoor sculpture light with frame, or wall lighting for a variety of applications.
Figure 27:
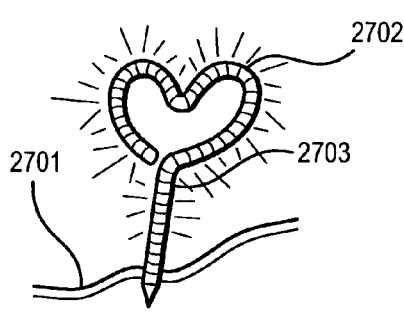
FIG. 27 illustrates a preferred embodiment for applying the tubular light device as a garden light which may powered by a solar power system or low-voltage light system. The tubular light device can be used as a pathmarker, delineator light, shape light with stake in the ground, swimming pool light, patio light, post light, or indicia light for garden application as an accent or for illumination.
Figure 28:
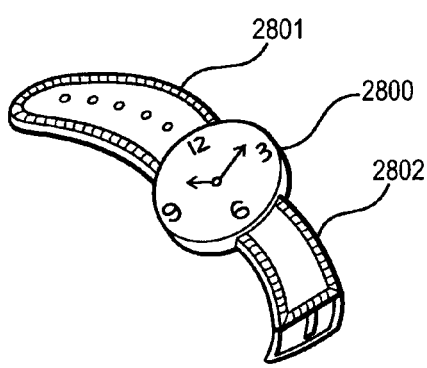
FIG. 28 illustrates a preferred embodiment for applying the tubular light device to a time piece for a desk top, wall, or person.

FIG. (15F) shows an alternative for a piping arrangement. The tubular light devices (9100) (9120) are within the stitchable holder which has a stitch edge to allow stitching on a shoe proper location to make piping effects to follow the shoe edge with special light effects. The arrangements shown in FIG. 15A to FIG. 15F are similar to those shown in U.S. Pat. No. 6,082,867 of the same Inventor with some changes for current invention with panel light device within a tube means.

FIGS. (15G to 15H6) show footwear applications in which tubular EL panel light kits are installed as a decorative piping (9110'), or decorative strap (9110) which has a geometric shape of tube means to load EL panels within. The same principles apply to (908) (9109) geometric tube means. The tubular EL panel light kits also can have twisted panels as indicated by (9110'T) (9110") which offer special design and appearance to the consumer.

FIG. (15H1) shows a tube holder arrangement to hold a 360 degree tubular EL panel light. The tubular light kits (9121) are held within the 360 degree tube holder (9122). FIG. (15H2) shows a tube holder (9123) arranged to hold the tubular light device (9121) over an arc of 210 degrees. FIG. (15H3) shows a tube holder (9124) arranged to hold a tubular light device (9121) over a 270 degree arc. FIG. (15H4) shows a tube holder (9125) arranged to hold tubular EL panel light kits (9121) in a tunnel arrangement. FIG. (15H5) shows a tube holder arrangement (9126) to hold a tubular EL panel light (9121) as a geometric tube holder which to meet a special design for requirement. FIG. (15H6) is for a normal piping arrangement, in which the tube holder (9127) holds the tubular EL panel light kits (9121) and offers a stitchable edge for stitching to main objects including a shoe upper, car textile items including a seat cover, car cover, pillow cover, safety belt cover, steering wheel cover, handle bar cover, boot cover, car mate, seat cushion, garment, all purpose textile, jeans, jacket, apparel, cap, belt, band, glove, curtain, furniture, purse, bag, bra, underwear, foam material, protective sleeve, pants, socks, or other applications. The attachment means can use stitching, ultrasonic or hot sealing, glue, tape, refit, screws, snap on fasteners, melt bonding, a solvent, chemical bonding material, or other adhesive to fix the tubular EL panel light device on these main objects with secure attachment and offer illumination for all purposes.

FIGS. (15I to 15L) teach all kinds of applications for a working zone or highway for warning light or guide light purposes. The tubular light device (9100T) includes a flat-EL panel within a tube-means for installation on a new jersey deck to provide a side warning light. The tubular light kits, including twisted EL panels (9100TW) with one lit-area and one dark-area similar to the current traffic yellow/dark warning color, are applied to the proper location of a new Jersey deck (116). This is the most efficient use of the twisted EL panels to get one lit-area and one dark-area with a right color to fit into the workzone and highway application for best cost and simple application. FIG. (15J) shows the same two twisted EL panels tubular light device (9100TW) applied on the boards (9120) for lighted illumination warning light function. The twisted EL panel can provide an output with purely yellow color and non-lit back side with a fully dark color painted thereon so that the device will look similar or close to traditional traffic warning colors for road users to notice the hazard location.

FIG. (15K) shows highway ramp curve areas with the tubular EL panel light device (9100TW) on different locations of the highway wall, new jersey deck, fence, traffic cone, bar, hanging sign, barricade etc. The twisted EL panel can be printed with a local-government-required color for one side with light and painted on the non-lit area with another color to match the color requirement. The tubular light device (9100TW) for location (9120) can have a big diameter such as 10 cm to fit an EL panel with 8 cm width incorporating a big inverter with sufficiently strong power output to a bus wire over the whole ramp length so that the left end and right end will have same brightness. The tubular EL panel light with twisted treatment (9100TW) also can be applied on wall (9118) cause the light to be visible from a single viewing angle and not waste the top light tube for all viewing direction. FIG. (15L) shows a traffic cone with a twisted panel (9100TW) and the bar and sign location. These offer a very bright warning sign.

FIG. (15M) shows a tubular light device with flat EL panel (9100) are arranged for the sign frame application. FIG. (15N) shows a tubular EL panel light kit (9100) that may be applied to a garment, apparel, jeans, underwear, or bra. FIG. (15O) shows application of a tubular EL panel light device (9100) within a tube holder with a predetermined number of tubular light devices, color of tubular light device, and function of tubular light device with desired electrodes to attach to a main including a car, boat, airplane, bus, garment, jeans, textile items, shoe, cap, hat, backpack, lifevest, skating board, toy, infant tricycle, mat, mattress, curtain, table, chain, bar table, furniture, house, wood items, Christmas tree, Christmas angel, Christmas tree top light, Christmas door ornament, Christmas tinsel, Christmas window sign, Christmas outdoor sculpture with frame, garden light, outdoor solar power light device, etc. FIG. ((15P) discloses a tubular light device within a textile tube holder which enables the light to be visible from outside, such as a shoelace, band, headband, arm band, or belt applications.

FIG. (16A) shows a tubular EL panel light device installed in a Velcro band to provide a piping or decoration strap for a shoe upper (16A01) or to follow the shoe button contour with light kits (16A02). FIG. (16B) shows a beach slide with EVA button having a tubular EL panel light device on an upper surface, which directly uses the tubular EL panel light device (16B01) as the fastening means to hold the user's foot in place. The light device (16B02) can be designed to be attached on the button wall to follow the button contour. From FIG. (16C) the tubular EL panel light device can be installed on a shoe upper band edge (16C01) (16C02) or the footwear button wall to follow the contour shape.

FIG. (17) shows a sport saddle with a lot of straps and supports on the shoe upper, and a tubular EL panel light device installed on the (1701) rear strap, (1702) rear support, (1703) support, (1704) upper surface, (1705) upper front surface, (1706) piping for strap, (1707) piping, (1708) button sidewall, and (1709) rear gel piece. These areas can be provided with the tubular EL panel light device without any bending defects, and can easily be installed by traditional methods including stitching, hot-sealing, glue, or ultrasonic sealing, to securely position the tubular light device.

FIG. (18) shows a tubular EL panel light device (1803) (1804) (1805) (1802) installed on a backpack (1800), purse, bag, all purpose container for people to carry items while they walk away from position 1 to position 2 on earth. The tubular light device can be installed as discussed above in the manner illustrated in FIG. (15H1 to H6) or FIG. (15B-F) using proper attachment means, including any commercially available attachment means.

FIG. (19) shows a tubular EL panel light device (1901) (1902) (1903) (1905) attached to a life vest for the best light arrangement.

FIG. (20) shows a tubular EL panel light device (2101) (2102) for a cap (2100).

FIG. (21) shows a tubular EL panel light device (2001) (2002) attached on a moving device (2100) include a skating shoe, skating board, skating car, or toy with wheel for best light arrangement.

FIG. (22) shows a tubular EL panel light device (2201) (2202) (2203) (2204) attached to traffic work zone equipment such as a traffic cone, sign, bar, fence, barricade, or wall for best application similar to that shown in FIG. (15M to 15P).

FIG. (23) shows a tubular EL panel light device (2301) (2302) (2303) (2304) 92305) (2306) (2307) for indoor installation on a building, house, home for delineator, safety light, marking, decoration light, evacuation light, accent light, stairs, wall corner, door, and floor.

FIG. (24) shows a tubular EL panel light device (2401) (2402) (2403) (2404) (2405) (2406) (2407) (2408) (2409) for wall, roof, garage door, window, door, fence, or house number, with tubular EL panel lights for all outdoor applications which can replace all expensive neon light tubes and electro-luminescent wires which are very expensive with breakage and low brightness problems.

FIG. (25) shows tubular EL panel light device (s) (2501) (2502) for any sign, poster, or slogan for all purposes with a desired light brightness, color, and motion light effects for advertisement, selection, or promotion, which can be incorporated with a motion sensor for turning the system on and with a built-in IC chip to control the duration and off time.

FIG. (26) shows tubular EL panel light device (s) (2601) (2602) for seasonal lighting for a tree, tinsel, ornament, tree top, angel light, candle light kits, wall sign, outdoor sculpture with frame, or window sign with seasonal figure and wording.

FIG. (27) shows tubular EL panel light device (s) (2702) (2703) for a garden light which has a low-voltage power system with wire (2701) to get power to turn on. It also can be incorporated with a solar power system which does not need wires like a low-voltage light system. The light device (s) can include any shape, figure, or indicia with desired color brightness, turn on time, timing setting, different size, and Do-It-Yourself features to let the consumer obtain any desired shape. The inner non-elastic means can be very strong to eliminate the need for a frame forming large outdoor sculpture-type light sets, which may be higher than 6 feet or more. This can improve all current light structures, solving the problems with current LED and tube lights by reducing breakage, increasing brightness, reducing weight, and providing improved structural support without a frame.

FIG. (28) shows tubular EL panel light device (s) (2801) (2802) for a time piece for a desktop, wall, or people wearing device for providing illumination. The wall time piece is mainly powered by batteries so it can incorporated with a "Motion Sensor" to turn on the light device for a certain time while people walk by at the night time or dark environment so can offer good light and illumination to people are present.

FIG. (29) shows tubular EL panel light device (s) (9100) for a toy (2900) necklace or other decoration light for different purposes.

FIG. (30) shows tubular EL panel light device (s) (3001) (3002) (3003) for toys which have moving devices such as a wheel or low friction resistance when an outside force is applied, such as a race car, tricycle, motor vehicle, walker etc.

FIG. (31) shows tubular EL panel light device (s) for game application such as for a dancing mat, mathematics mat, alphabet mat, or jogging mat which uses a tubular light device (3101) (3102) to offer light effects. This application also can be adapted for any design shape, size, and predetermined function.

FIG. (32) shows tubular EL panel light device (s) (3201) (3202) (3203) (3204) (3205) for a chair, table, display furniture, closet, show case, shelves, or rack, for decoration, promotion, display, or feature reminder to all consumers for a retail business.

FIG. (33) shows tubular EL panel light device (s) with weaving features for the EL panels, the twisted being illustrated as (xx) (oo) (aa) (bb) (cc) (dd), to provide a different color, brightness, or size for hair related items, jewelry related items, bracelet, hair band, necklace, pendent, breast pin, or button including other attachment accessories as needed to provide a certain application for a variety of fashion applications.

Having thus described various preferred embodiments of the invention, those skilled in the art will appreciated that variations and modifications of the preferred embodiment may be made without departing from the scope of the invention. It is accordingly intended that the invention not be limited by the above description or accompanying drawings, but that is be defined solely in accordance with the appended claims.

The invention claimed is:

1. A tubular electro-luminescent (EL) panel light device, comprising:
    at least one flexible electro-luminescent panel having a predetermined width and length;
    at least one soft tube, said flexible electro-luminescent panel being positioned within said soft tube and twisted around an inner member to form at least two coils such that a surface of said panel emits light through said at least one soft tube in multiple directions; and
    means for attaching the electro-luminescent panel light device to a main object,
    wherein said at least one soft tube and said EL panel each have a length of greater than six inches,
    wherein adjacent edges of said coils are spaced from each other to permit bending of said inner member and said panel in any direction, and
    wherein said inner member is selected from the group consisting of a cushioning member, a protection member, an electrically conductive member, and a source of electrical signals for said electro-luminescent panel.

2. A tubular electro-luminescent element as claimed in claim 1, wherein said at least one soft tube has properties selected from the group consisting of transparency, translucence, partial transparency, partial masking, opaque areas, convexity, concavity, smooth wall thickness, uneven wall thickness, geometrically-shaped cross-sections, coloring, mixed particles, and optical properties.

3. A tubular electro-luminescent element as claimed in claim 1, wherein a thickness of said soft tube is sufficient to enable bending of said lighting device without forming any sharp angles.

4. A tubular electro-luminescent element as claimed in claim 1, wherein said electro-luminescent panel emits light from two sides.

5. A tubular electro-luminescent element as claimed in claim 1, wherein said electro-luminescent panel includes two single-sided panels placed back-to-back.

6. A tubular electro-luminescent element as claimed in claim 1, wherein said electro-luminescent panel emits light from a single side.

7. A tubular electro-luminescent element as claimed in claim 1, wherein said inner member is a non-elastic elongated member that retains a shape to which it is bent.

8. A tubular electro-luminescent element as claimed in claim 7, wherein said inner member is a metal wire.

9. A tubular electro-luminescent element as claimed in claim 1, wherein said at least one electro-luminescent panel include multiple panels arranged to provide special effects.

10. A tubular electro-luminescent element as claimed in claim 1, wherein said tube has a non-cylindrical shape.

11. A tubular electro-luminescent element as claimed in claim 10, wherein said tube has a flattened cross-section so that a thickness of said lighting device is different than a length.

12. A tubular electro-luminescent element as claimed in claim 1, further comprising means for supplying signals to said lighting element to provide a desired color and brightness.

13. A tubular electro-luminescent element as claimed in claim 1, wherein said inner member supplies electric signals from a power pack to said at least one electro-luminescent panel.

14. A tubular electro-luminescent element as claimed in claim 1, wherein said main object is a piece of jewelry.

15. A tubular electro-luminescent element as claimed in claim 1, wherein said lighting device is part of a light kit including circuit means for providing lighting functions and a power source.

* * * * *